USo11170382B2

(12) United States Patent
Bagley et al.

(10) Patent No.: US 11,170,382 B2
(45) Date of Patent: Nov. 9, 2021

(54) SYSTEMS AND METHODS TO DISCOVER AND QUANTIFY KEY DRIVING FACTORS IN DIGITAL CONTAINMENT DATA

(71) Applicant: ClickFox, Inc., Greenwood Village, CO (US)

(72) Inventors: William Robert Bagley, Greenwood Villiage, CO (US); Adam Rubin, Greenwood Villiage, CO (US); Kyle Rattet, Greenwood Village, CO (US); Joshua Templeton, Greenwood Village, CO (US); David Holiday, Greenwood Village, CO (US); Michael Herman, Greenwood Village, CO (US); Christopher Andrew Clarke, Greenwood Village, CO (US)

(73) Assignee: ClickFox, Inc., Greenwood Village, CO (US)

( * ) Notice: Subject to any disclaimer, the term of this patent is extended or adjusted under 35 U.S.C. 154(b) by 328 days.

(21) Appl. No.: 16/296,927

(22) Filed: Mar. 8, 2019

(65) Prior Publication Data
US 2019/0279224 A1    Sep. 12, 2019

Related U.S. Application Data

(60) Provisional application No. 62/640,747, filed on Mar. 9, 2018.

(51) Int. Cl.
*G06Q 30/00* (2012.01)
*H04L 29/08* (2006.01)
*H04M 3/51* (2006.01)
*G06Q 10/06* (2012.01)

(52) U.S. Cl.
CPC ..... *G06Q 30/016* (2013.01); *G06Q 10/06395* (2013.01); *H04L 67/22* (2013.01); *H04M 3/5191* (2013.01)

(58) Field of Classification Search
CPC ............. G06Q 10/06395; G06Q 30/016; H04L 67/22; H04M 3/5191
USPC .......................................... 707/808
See application file for complete search history.

(56) References Cited

U.S. PATENT DOCUMENTS

| 7,673,340 | B1* | 3/2010 | Cohen | G06F 11/3438 726/22 |
|---|---|---|---|---|
| 2016/0371703 | A1* | 12/2016 | Mon Egan | H04L 67/306 |
| 2017/0308917 | A1* | 10/2017 | Winters | G06Q 30/0203 |
| 2018/0082311 | A1* | 3/2018 | Werner | H04L 51/16 |
| 2018/0315000 | A1* | 11/2018 | Kulkarni | H04W 88/16 |

* cited by examiner

*Primary Examiner* — Joshua Bullock
(74) *Attorney, Agent, or Firm* — Troutman Pepper Hamilton Sanders LLP; Christopher C. Close, Jr.

(57) ABSTRACT

Analytical methods and systems applied to a plurality of input files to understand and explain crucial factors leading to customers jumping, or hopping, from one channel to another channel. The methods and systems described may include receiving a first file associated with a first channel dataset and receiving a second file associated with a second channel dataset. The methods and systems described may include merging the two datasets based on key fields found within the metadata of the two files. In some embodiments, additional statistical metrics and measures may be applied to the merged dataset to both rank the merged events and to display the characteristics of each event within the entire merged dataset.

19 Claims, 19 Drawing Sheets

SYSTEMS AND METHODS TO DISCOVER AND QUANTIFY KEY DRIVING FACTORS IN DIGITAL CONTAINMENT DATA

CROSS-REFERENCE TO RELATED APPLICATIONS

This application claims priority to, and the benefit under 35 U.S.C. § 119(e), of U.S. Provisional Patent Application No. 62/640,747, filed 9 Mar. 2018, the entire contents and substance of which are hereby incorporated by reference as if fully set forth below.

BACKGROUND

In this modern, mobile, digital age, many companies are benefiting from offering to more digitally-connected customers a lower-cost, automated interaction opportunity while also increasing customer satisfaction among said demographic. For example, digital (i.e., self-service) options can satisfy essential and sometimes advanced service needs without requiring an expensive in-person visit or a telephone call to a customer service representative or troubleshooting agent. A large subset of the total customer group is also partially, or somewhat, digitally savvy and often attempts to interact with companies through those same digital mechanisms. Despite the willingness and desire of these customer segments to engage with self-service customer service options, typical complications that customer service-related organizations face (e.g., unforeseen technical issues, non-intuitive or confusing digital instructions or queues, or additional potentially interrelated complications) often force customers to interact with more costly channels instead of the lower-cost options the customers would otherwise be inclined to use. When customers attempt to use a digital channel and are then forced to a higher-cost traditional option, a company or provider can expect two results: (1) increased cost to the provider and (2) additional customer frustration from the failed attempt to use the digital option. Thus, as can be appreciated, containing appropriate customer segments to more efficient, lower cost interaction channels provides potential financial and customer loyalty benefits; but risks also exist with the current digital containment systems and techniques.

Digital containment encompasses the practice of collecting the relevant data relating to a customer journey, the science of quantifying these customer journeys, and the business of recommending intelligent mitigation actions and strategies to keep these high-cost interactions as low-cost as possible while increasing the traffic through digital interaction channels or journey-paths. Previous solutions have had some success in identifying potential sources of customer "leakage" and calculating metrics such as containment rates under some limited circumstances, but the previous solutions do so by relying on heuristics or manual analytical methods. These labor-intensive processes typically happen outside of the scope of the primary software application—clearly an expensive, incomplete, and unrepeatable practice. What is needed, therefore, are systems and methods that do not rely on approximations or separate manual analytical methods to provide insight into customers jumping from one channel to another channel.

SUMMARY

The above needs and others are addressed by certain implementations of the disclosed technologies. Certain implementations of the present systems and methods relate generally to analytical methods applied to input data to understand and mitigate costly customer service interactions. More specifically, the disclosed technologies relate to analyzing and quantifying the relative importance of events leading to outcomes where lower-cost and/or higher technology customer interaction opportunities are not providing sufficient cost savings, or where customer satisfaction scores are unacceptably low in connection to said digital communication/service channels. This leads to customers interacting with the company via high-cost methods such as telephone or in-person methods or channels. The disclosed technologies facilitate this understanding despite situations where one or more of the representative supporting data sources are prohibitively large, involve many steps across a duality of channels (in person, on a mobile device, on a desktop device, via a call center, etc.), or are excessively complex.

Certain implementations of the present technologies include a more complete system, which combines powerful and flexible computational methodologies and intuitive visual features, elements, and functionality designed to encompass many features, methods, and conveniences that are currently unavailable in other systems. Accordingly, the disclosed systems and methods can provide high confidence answers to timely, high-value business questions. The answers are provided within a framework conceived to transcend simple aggregative methods, engineered to be handle "big data" or distributed-scale input feeds, and designed to provide an intuitive user interface to save the analyst's time in reaching those conclusions. Existing digital containment analysis system ("DCAS") solutions are deficient because, in their combinations of the digital and in-person data sources or channels, they rely on a description or model of time-based interactions that is constant in value. For instance, when computationally combining the data from a plurality of interaction channels, (such as the individual datasets present in customer web, Interactive Voice Response ("IVR") systems, or mobile platforms) current systems apply the assumption that all interactions between channels happen within the same period of time. It is these limiting assumptions that manifests in the lower-fidelity answers achieved by existing methods.

These prior solutions lack the architectural flexibility necessary to adequately capture the sometimes-subtle underlying dynamics within these customer journeys. The reason for this is simple: not all digital and in-person channels couple in the same way. As such, previous solutions merely provide low fidelity, coarse-grain answers to complex questions. They also lack the robust analytical foundation necessary to sufficiently characterize the process to sufficient resolution to properly and conclusively solve the problem at hand. To adequately respond to the business needs in this area, a tool must do more than simply combine data and perform straightforward counts and averages. This is particularly evident when examining the types of business questions that can be adequately answered by crude aggregations such as counts and averages. For instance, it is of some value to know that in a given week, 5,000 events occurred—such as customers connecting with a call center.

The disclosed systems and methods go beyond this rudimentary information because it is more valuable to know the final digital event performed by the customer prior to the call center connection. It is undeniably more valuable to know, from the very same set of data and by using the disclosed technology for any given digital event, the likelihood of a customer being forced to a call center because of that (or any) action—and what to do to mitigate this behavior. For such nuances to be present in the final product, a method must have at least that much fidelity in the methods of calculation. With the systems and methods described herein, the datasets are computationally processed in such a novel way as to expose these dramatic insights—all without resorting to ad hoc models or simplifications of the interaction couplings that created the events in question.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE FIGURES

The accompanying drawings illustrate one or more embodiments and/or aspects of the disclosed systems and methods and, together with the written description, serve to explain the principles of the disclosure. Wherever possible, the same reference names are used throughout the drawings to refer to the same or like elements of an embodiment.

DETAILED DESCRIPTION

Figure 1:
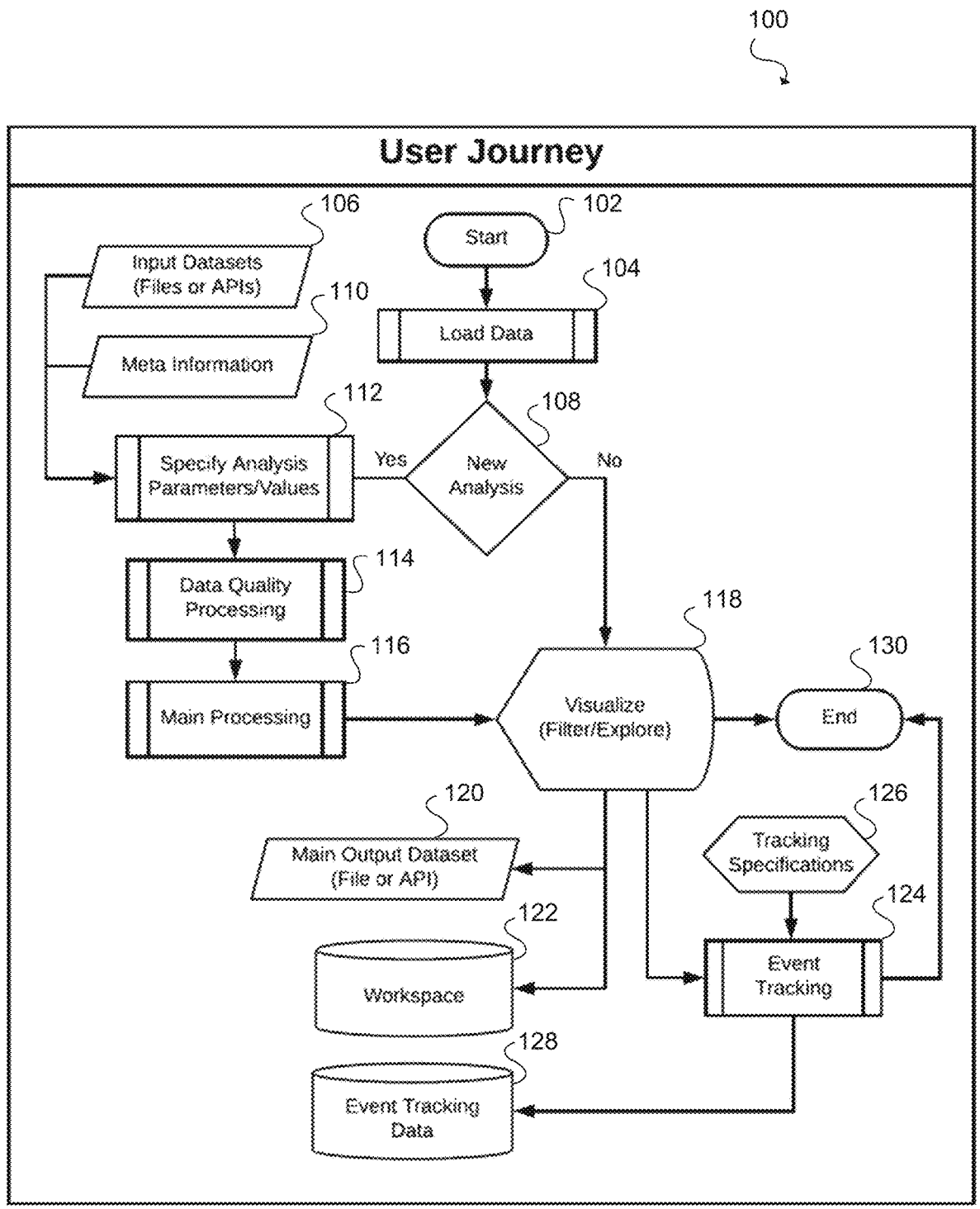
FIG. 1 is a view of a simplified iterative, exploratory process for a DCAS, in accordance with some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It also is to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

To facilitate an understanding of the principles and features of the disclosure, various illustrative embodiments are explained below. In particular, the presently disclosed subject matter is described in the context of analytical methods and systems applied to a plurality of input files to understand and explain crucial factors leading to customers jumping, or hopping, from one channel to another channel. The present disclosure, however, is not so limited, and can be applicable in other contexts. For example and not limitation, some embodiments of the present disclosure may improve other statistical and analytical systems, including but not limited to any customer data monitoring. These embodiments are contemplated within the scope of the present disclosure. Accordingly, when the present disclosure is described in the context of analyzing cross-channel leakage of customers, it will be understood that other embodiments can take the place of those referred to.

Embodiments of the presently disclosed subject matter can include a method to mitigate the high costs companies face providing service to customers who initiate a digital transaction but instead finish that task or sequence of events (i.e., the customer's "journey") by interacting with traditional, non-digital manners or channels. Similarly, aspects of the disclosed technology can include a method to discover, quantify, and address the negative customer satisfaction effects inherent to a non-optimized digital experience.

Aspects of the disclosed technology can provide large-scale—or big data—quantitative methods relying on rigorous determination of underlying cross-channel paths and their relationships or couplings. In some aspects, the disclosed technology can leverage journey science, which includes the application of more scientific methods to the practice of understanding, predicting, and explaining the complex customer journey. For example, aspects of the disclosed technology recognize that the scientific method and practical experience both dictate that extensible, flexible, and scalable methodologies, coupled with higher fidelity mathematical descriptions of the interactions, generate higher quality, more relevant answers. These methodologies are important to capturing the essence of the driving factors behind the undesired non-digital populations.

Aspects of the disclosed technology further include methods for ingesting large amounts of data from a plurality of sources and formats, performing advanced, custom transformations, and combining the collected and transformed data to facilitate analysis. This analysis can be conducted using, for example, distributed or parallel computational methods or approaches instantiated on a cluster or plurality of processing and storage units. As will be appreciated, the presently disclosed systems and methods allow for automatic or manual adjustment for varying temporal effects of the cross-channel coupling when ingesting data. Previous solutions are unable to allow for such adjustments as they rely on single, fixed values for the period of time over which an event by a user or group could be considered germane or otherwise coupled to or associated with an event or sequence from the other data source. In the disclosed embodiments, however, such variability of temporal effects can take the form of gated time-windows of different lengths based on the definitions of the channels being examined. In other embodiments, time-dependent coupling can manifest in differing time coupling between customer journey events or elements within the same set of channels based on another set of rules or definitions available to the system. In additional embodiments, the optimal coupling time period for a given set of interactions or channels can be returned by advanced probabilistic determinations with no manual intervention or specification. This flexibility in the time-series accounting of the cross-channel coupling provides a fuller, more inclusive view of the interactions or ways the events from two events can combine.

In some embodiments, the analysis can include calculating advanced statistical measures associated with the 2-channel customer journeys, such as the predictive probability of the incoming event and explanatory probabilities of the outcome, volume ratios, event correlations, statistical lift and a proprietary statistical impact measure—similar in form to, but possessing superior characteristics to, a two-proportion Z-score.

Previous solutions rely upon linking events between the two data sets and performing aggregate metric calculations based on the totals or averages of the coupled events. But the disclosed subject matter provides a more robust solution by performing very accurate, large-scale probabilistic calculations. These calculations, which can leverage techniques from the combinatorics branch of mathematics, quantify the indirect combinations arising from a sequence of events representing all the possible ways in which the prior events are observed to result in a current event. The resulting intermediate datasets generated by performing these combinatorics-style calculations on these paired events or objects can facilitate the further calculation of advanced and custom statistical measures that represent a significant departure from the standard, simple, descriptive statistics used currently to describe event sequences.

The systems and methods of the present disclosure can make these measures available to an analytical graphical user interface (GUI) for visualizing the resulting datasets and providing novel analytical interactions. Providing the measures in a GUI allows for a host of analytic manipulations and numeric calculations, such as sorting, prioritizing, highlighting, or emphasizing results. When applied across the entire dataset in this way, these statistical measures form a distribution, which conveys additional richness and context to the user. This enhanced understanding—capable from these presently disclosed systems and methods—offer both more specific information and broader perspective than traditional approaches. As will be appreciated, aspects of the present disclosure can include additional features not found in conventional approaches, including features that enable and encourage collaboration among analysts and/or business process-owners.

In addition to the standard set of metrics and measures (such as the ratio of complete customer journeys, the completion rates, identifying the most difficult, or least-frequent step in the journey) and steps associated with the most positive or negative customer sentiment, the presently disclosed technologies generate and provide to the GUI additional desirable metrics and measures. A nonlimiting list of examples includes: the associated average cost of each of the driving factors identified by the software and the various statistical measures described herein.

Many of the existing solutions consider the graphical user interface simply as a means to view static data generated by a system. The presently disclosed technologies go beyond a static system and promote the end user to a central participant in an interactive environment. With the present systems and methods, the actions of data specification, combination, visualization, exploration, and presentation are performed in an intuitive and interactive manner. This novel architecture allows the analyst and/or business consumer to answer questions not obvious or known when the primary computations were performed—thereby transforming the traditional, cumbersome process of generating insights into a much more accessible tool. An example of this extension is the ability of the analyst to select custom time-bound subsets of the ratios or metrics generated by the back-end.

Additional examples of these enhancements include the ability to sort, filter, and aggregate according to other attributes, including ratios, metrics, measures, and attributes defined herein. In some embodiments, for instance, the customer type classification can be used as an aggregation attribute, allowing for a categorical or longitudinal view of the completion rates and/or customer satisfaction among all subsets of customers.

In various embodiments, the GUI can also feature innovative and insightful graphic components, which combine output elements generated by the computational stage of the systems and provide insight into the relative importance of the events generated. These novel visualizations can be generated by plotting two complimentary attributes of a given event on orthogonal axes, thereby allowing a visual inspection of multiple statistical subsets or entire-dataset distributions. In some embodiments, the systems and methods can generate a figure by plotting the calls vs. the call rate per unit time in a chart, which is useful in the prioritization of dominant, detrimental events in the customer journeys for the given two channels examined. A description of an exemplary plotting chart is provided herein in the discussion for FIGS. 10-11. The system can also manipulate, via user input, these unique and useful graphics generated by the current disclosed technology by panning or zooming to focus on certain regions of the plot.

Using the unique set of useful ratios, metrics, and measures generated by the computational stage, combined with innovative graphical elements, the GUI also possesses the ability to allow the user to navigate to a list of specific events that comprise a journey and view the correlation of that event with journeys that depart the specified channel for the selected time frame. As will be appreciated, such functionality can be a powerful feature designed to explain and rank commonalities among the constituent events—thereby allowing a user to ascertain or discover common driving forces not visible or explainable with current methods.

Using the flexible aggregation methods described herein, the GUI can present a ratio of attributes associated with individual data sequences beginning with a specific event that complete the journey within the designated channel versus all journeys for the same end goal or event. As will be appreciated, such functionality can provide, to an end user, insights associated with paths present in the customer journey set.

In addition, the GUI may also enable and facilitate collaboration amongst users of the product. For example, the system may achieve this collaboration by including images representing the events in the digital channels, such as an image of a webpage, and providing a method to produce and share messages within the hosted app.

The accompanying drawings illustrate one or more embodiments and/or aspects of the disclosure and, together with the written description, serve to explain the principles of the disclosure. Wherever possible, the same reference names are used throughout the drawings to refer to the same or like elements of an embodiment.

FIG. 1 depicts an exemplary user journey 100, according to some embodiments of the present disclosure. The figure is a high-level visual representation of the typical steps involved when using the present technologies. The journey starts 102 with loading a dataset 104 and selecting if the analysis is new (i.e., the dataset is an input dataset 106) or if the user wants to analyze a previous output, the selection taking place at operation 108. If a new analysis is being conducted, the system leads the user through the specification of meta information 110 and specification of analysis parameters and/or values 112. Data quality measures 114 ensure meaningful output by preprocessing the data and detecting deleterious issues in the data or specifications. As shown in FIG. 1, the data may then be made available to the process that performs the main processing 116 of the systems (i.e., merging or combination of the multi-channel data). The system may then provide these computational results via the interactive analysis environment at a visualization stage 118. The visualization stage 118 may include the innovative features provided via a graphical user interface, as described herein. From this stage 118 in the user journey, the user may save the newly created files and settings for use in other applications, for example by saving as a main output dataset 120, saving as a new workspace 122, or saving for use in event tracking 124. In some embodiments of the present systems and methods, the systems may receive input of tracking specifications 126 that may further limit or define the data produced by the system in event tracking 124. The data from event tracking 124 may be saved as event tracking data 128. The visualization stage 118 may also provide any of the visualization options and interfaces described herein. The various options allow a user to further analyze or interrogate the data products created in the main processing 116 stage. Finally, the user journey may end 130 after saving data or at any point within the journey.

Figure 2:
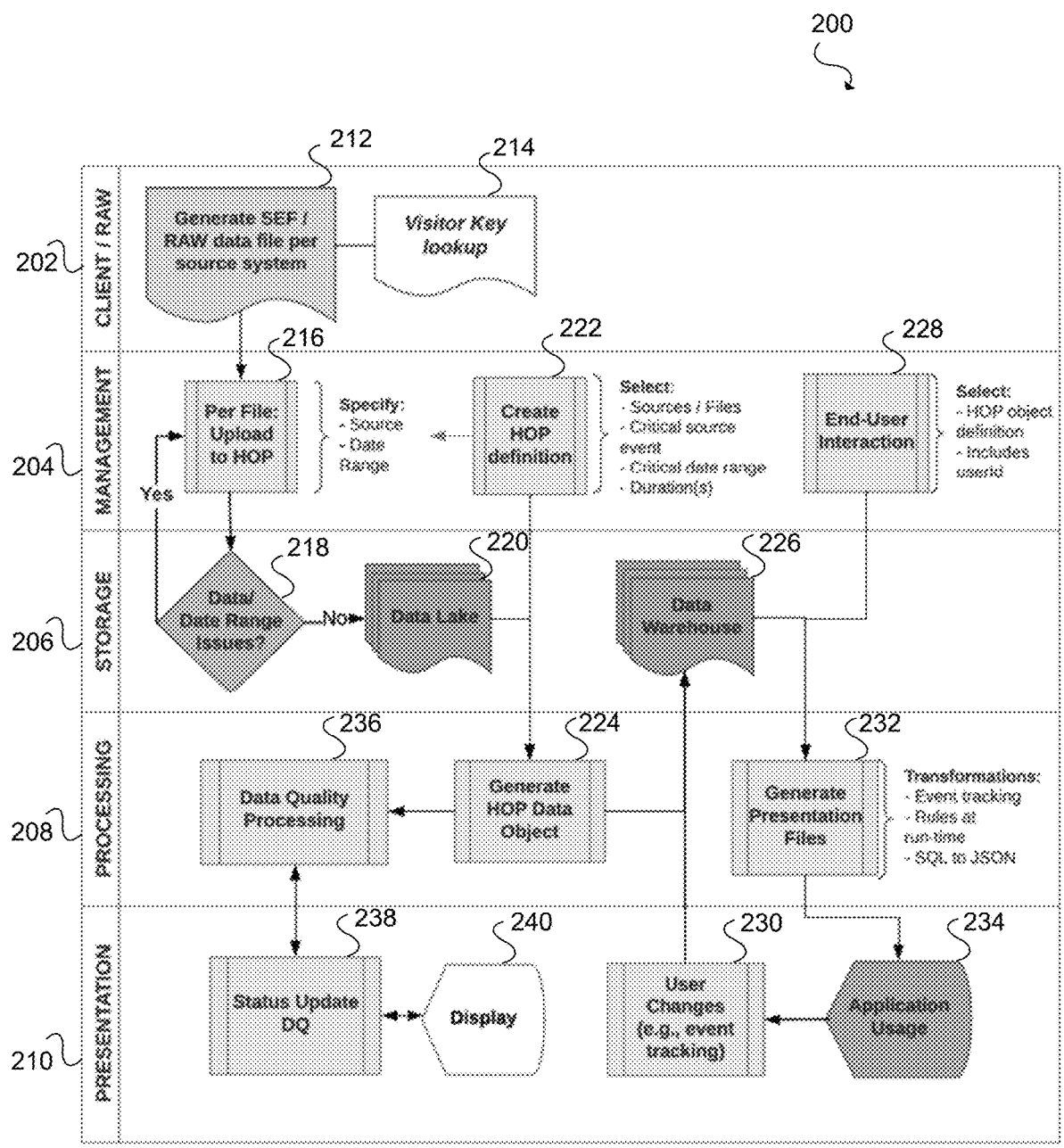
FIG. 2 is a process flow illustrating an exemplary system environment in which an embodiment of the disclosed DCAS may be realized, in accordance with some embodiments of the present disclosure.

FIG. 2 illustrates an exemplary system environment 200 in which an embodiment of the disclosed digital containment analysis system ("DCAS") may be utilized. In particular, FIG. 2 shows a high-level flow utilized by the disclosed systems and methods indicating relationships between the various system layers (i.e., Client/Raw layer 202, Management layer 204, Storage layer 206, Processing layer 208, and Presentation layer 210), according to some embodiments of the present disclosure. In this present DCAS example, the first step for the system is to generate a Standard Event Format ("SEF") file 212. From this format, all additional processing is possible. This generation process is initiated in the Client/Raw layer 202. In some embodiments, the systems may generate the SEF file 212 based on the specification of a merging key, as shown in the visitor key lookup 214 stage. From this point, the end-user of the DCAS may specify additional attributes to track or specify properties by which to perform the merging of the data sets. Once these files are uploaded into the system, additional properties of the data can be specified. In these files, events may be identified and arranged by duration between events, according to some embodiments. In alternate embodiments, the DCAS may arrange or organize the event information according to other parameters, for example and not limitation by event duration or time since common start. In a data sense, these files are the combination of a duality of separate channel datasets, and the merging of these distinct sources happens necessarily on a common key or shared attribute.

The DCAS may then proceed to the Management layer 204, where the system receives the files generated in upload to HOP 216 stage. At the upload to HOP 216 stage, the system may receive input, from an end-user, specifying the source of data (for example and not limitation, call-center data or website visit data) and, in some embodiments, specifying a particular date range in which to analyze. Subsequently, the DCAS may proceed to the Storage layer 206 which may involve the automatic detection of critical data issues 218. In some embodiments, the critical data issues 218 may include improperly specified or otherwise incompatible date ranges. If the DCAS detects no valid range specifications among the files to be merged, or if the application of the ranges specified are likely to return an insufficient amount of data to draw conclusions from, the system may provide a warning message to the user via the graphical user interface. If the system detects valid range specifications and no critical issues exist at the critical data issues 218 stage, the system may store the file 220 in a data lake or similar storage medium, which may be either local or remote in placement.

The system also provides a more comprehensive method for selecting attributes of interest at the Create HOP definition 222 stage in the Management layer 204. At the Create HOP definition 222 stage, the system may receive input of sources, critical source event information, critical date ranges, and/or durations that should define the data returned by the system. Once a HOP definition is defined (from stage 222), the system may commence the Generate HOP object 224 stage in the Processing layer 208. In this important stage, the data is first transformed according to the rules specified to form a final, merged set. This initial processing at stage 224, which generates the merged set, forms the basis for the advanced calculations, which is presented to the end-user in the application. These calculations identify all indirect sequences of events present in the generated or supplied SEF file and aggregate the appearances of these indirect sequences of events, returning a dataset which contains probabilistic statistical measures as well as advanced custom measures and metrics reflecting the impact of the sequences or events they describe. From this process at stage 224, the data may either be stored 226, and later accessed by the user End-User Interaction 228 stage, or sent to the Presentation layer 210 where, through interaction of the user 230 with the disclosed system and methods, the systems can change the state of the object in the storage. One example of this is the user-enabled feature of event tracking (e.g., at stage 230). From the End-User Interaction 228 stage, the system may allow a user to interact with the final dataset or resultant HOP object (generated at stage 224) in the course of his or her analysis, and the features identified in this embodiment enact changes to the stored state of the object. The system may process the entire class of operations available within a Generate presentation files 232 stage in the Processing layer 208. In some embodiments, these processing changes are applications of predefined rules that transact against the stored object, returning new views at runtime. In some embodiments, the system further allows a user to define additional attributes of interest at an application usage 234 stage. Finally, as shown in the figure, the system may also perform data quality processing 236 on the generated HOP dataset. This is similar to the Data quality measures 114 stage of FIG. 1. The system may provide the data quality processing 236 information to the user at a status update 238 as a display 240 within the graphical user interface.

Figure 3:
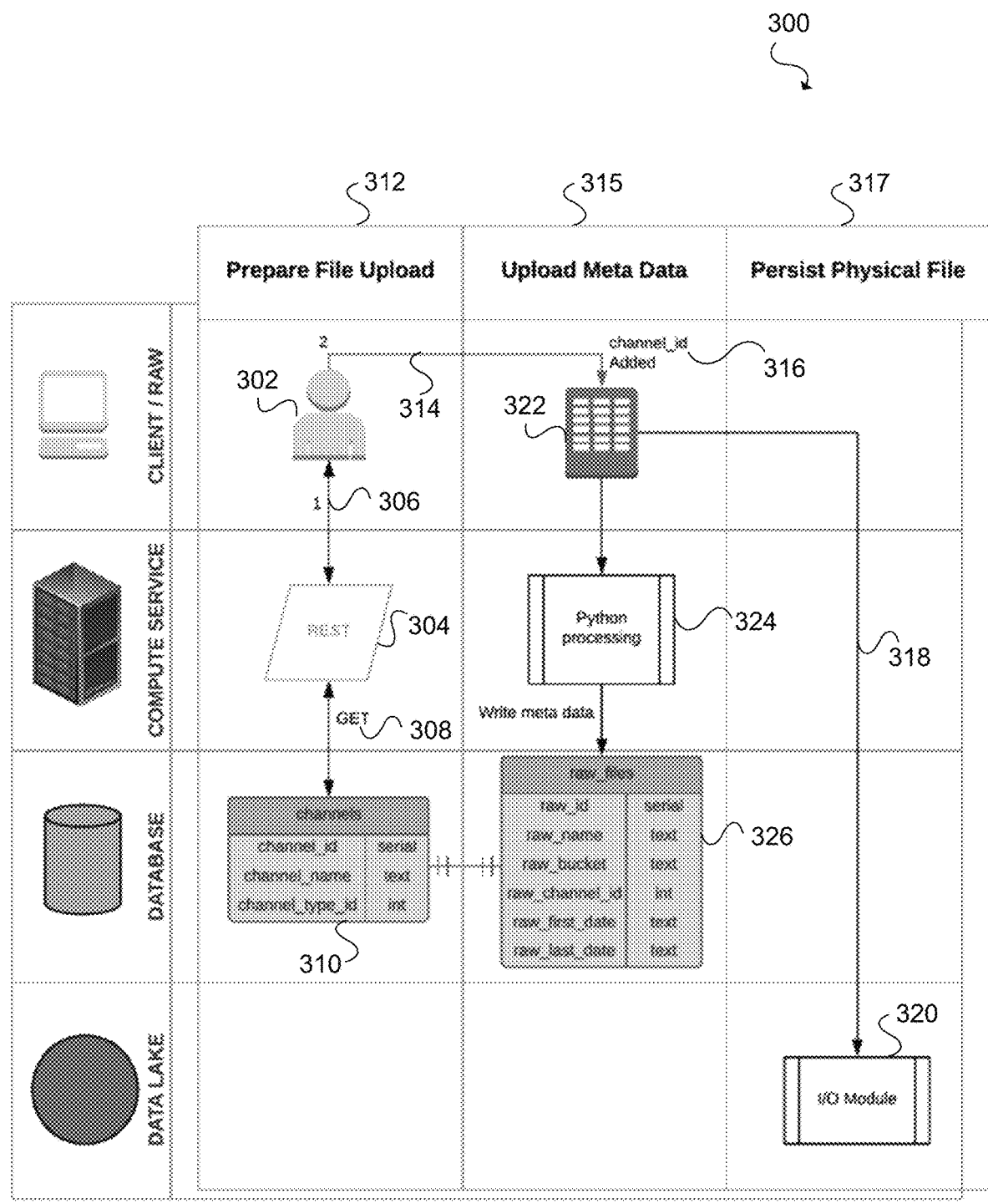
FIG. 3 is a process flow representing the high-level architecture of the disclosed DCAS and showing the data flow between various components of the DCAS, in accordance with some embodiments of the present disclosure.

FIG. 3 is a representation of the high-level architecture 300 present in some embodiments of the disclosed systems and methods showing the data flow between various components of the disclosed systems and methods. These component processes govern the file upload, metadata specification, and file persistence. The representation 300 depicts a user 302 making a Representational State Transfer ("REST") call 304 (at step 306) to a database to retrieve (at step 308) the channel information 310. This channel information 310 may contain, according to some embodiments of the present disclosure, channel_id, channel_name and/or channel_type_id information necessary to properly specify the plurality of channels which the DCAS will merge. This interaction takes place entirely in the Prepare File Upload swim lane 312 of the figure. It similarly involves the user 302 interacting via the described systems and methods with an interaction layer as well as a data store or database layer. Next, the user 302 uploads 314 the meta-information (or information about the data received from the REST call 304 seeking the channel information 310) in swim lane 315. In the presently described embodiment, this meta-information includes the channel_id information 316 retrieved from the channel information 310. Subsequently, the file may be stored or persisted 318 to any form of electronic storage 320, either connected via the local filesystem or transmitted to a remote data store or database (i.e., in swim lane 317). In addition to the persistence stage 318, from the "CLIENT/RAW"/"Upload Meta Data" stage 322 in the referenced figure, the system may perform the writing of metadata into raw files 326 (e.g., date inspection) of the channel information 310. In some embodiments, the writing of metadata into raw files 326 can be performed by a separate module 324 of the software. Upon completion of the writing of metadata into raw files 326 stage, the metadata may then also be stored or persisted 318 in an electronic data storage medium 320.

In the subsequent detailed descriptions of the figures, an exemplary workflow is presented to convey, for some embodiments of the disclosed systems and methods, typical functionality and features of the current technologies.

Figure 4:
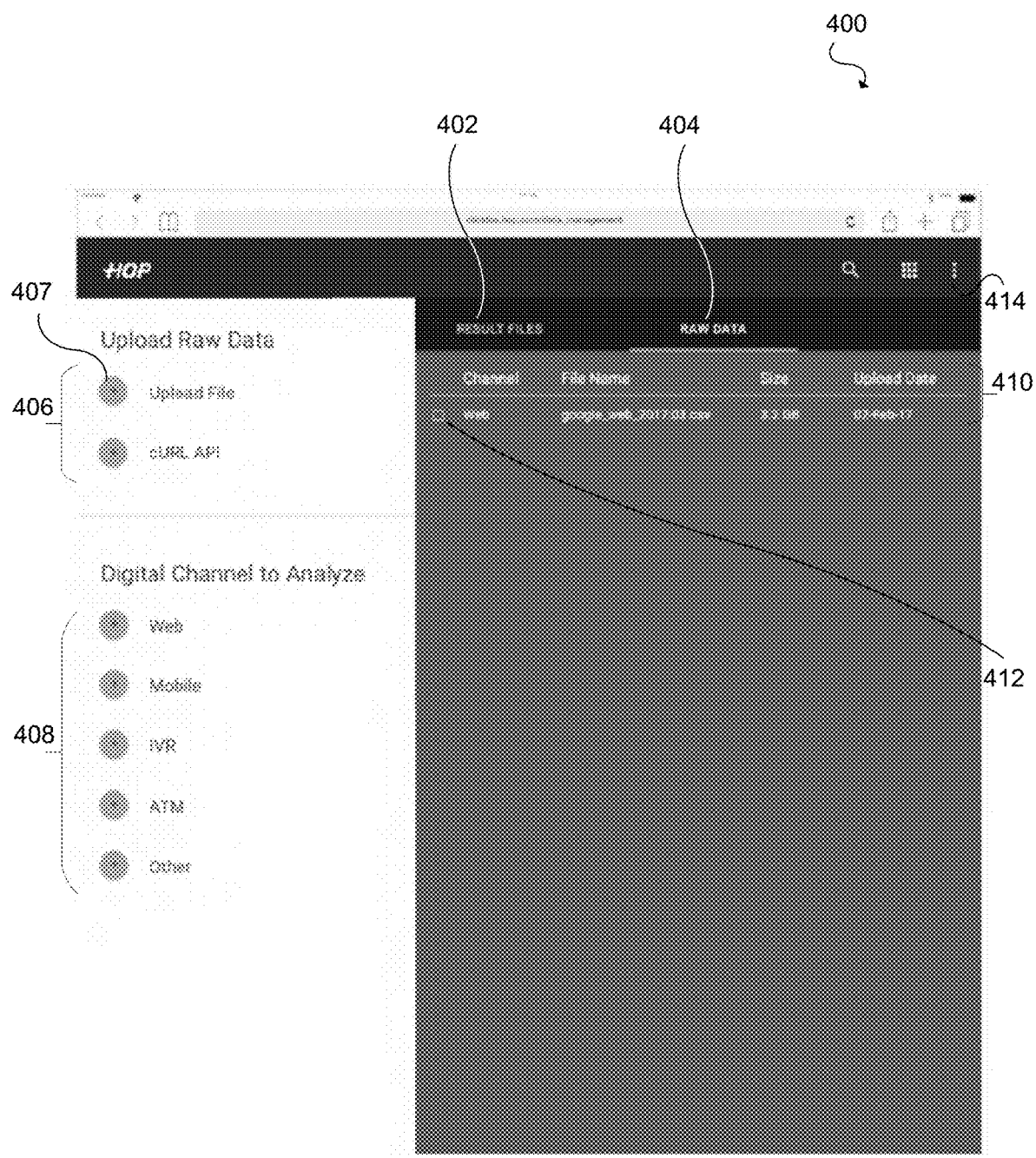
FIG. 4 is an example upload interface, in accordance with some embodiments of the present disclosure.

FIG. 4 is a view of an example upload screen 400, according to some embodiments of the present disclosure. In some embodiments, an upload screen 400 as shown in FIG. 4 can be the primary page from which all data ingestion, or loading of previously saved results, takes place. For example, from this upload screen 400, the system may receive previously processed results files—e.g., when a user selects a Results tab 402; the system may receive and process for inspection unprocessed, raw files—e.g., when a user selects a Raw Data tab 404. In some embodiments and as shown in FIG. 4, an upload screen 400 may also include an upload method menu bar 406 and a digital-channel-to-analyze menu bar 408. These menus 406, 408 can provide alternate starting points for the analysis by receiving, from an and user, a specification of type of files or type of channels to process before receiving and processing the file. As further shown in FIG. 4, an upload method menu bar 406 may provide various options for receiving a file. For example and not limitation, one upload option may be a direct connection (e.g., cURL API) to a data source. With this option, the data need not be located on the analyst's local filesystem. For example, the data could be a remote datastore or data lake shared amongst members of an analytic team. This method may be preferable for more advanced and/or non-centralized analytics teams. As will be appreciated, this cURL API method additionally allows the disclosed systems and methods to specify security protocols to keep the input data safe by requiring a safe connection for data transfer. An additional method, as shown in the figure, is an "Upload File" option 407. With this option, the system may receive a file present on a local filesystem.

Figure 5:
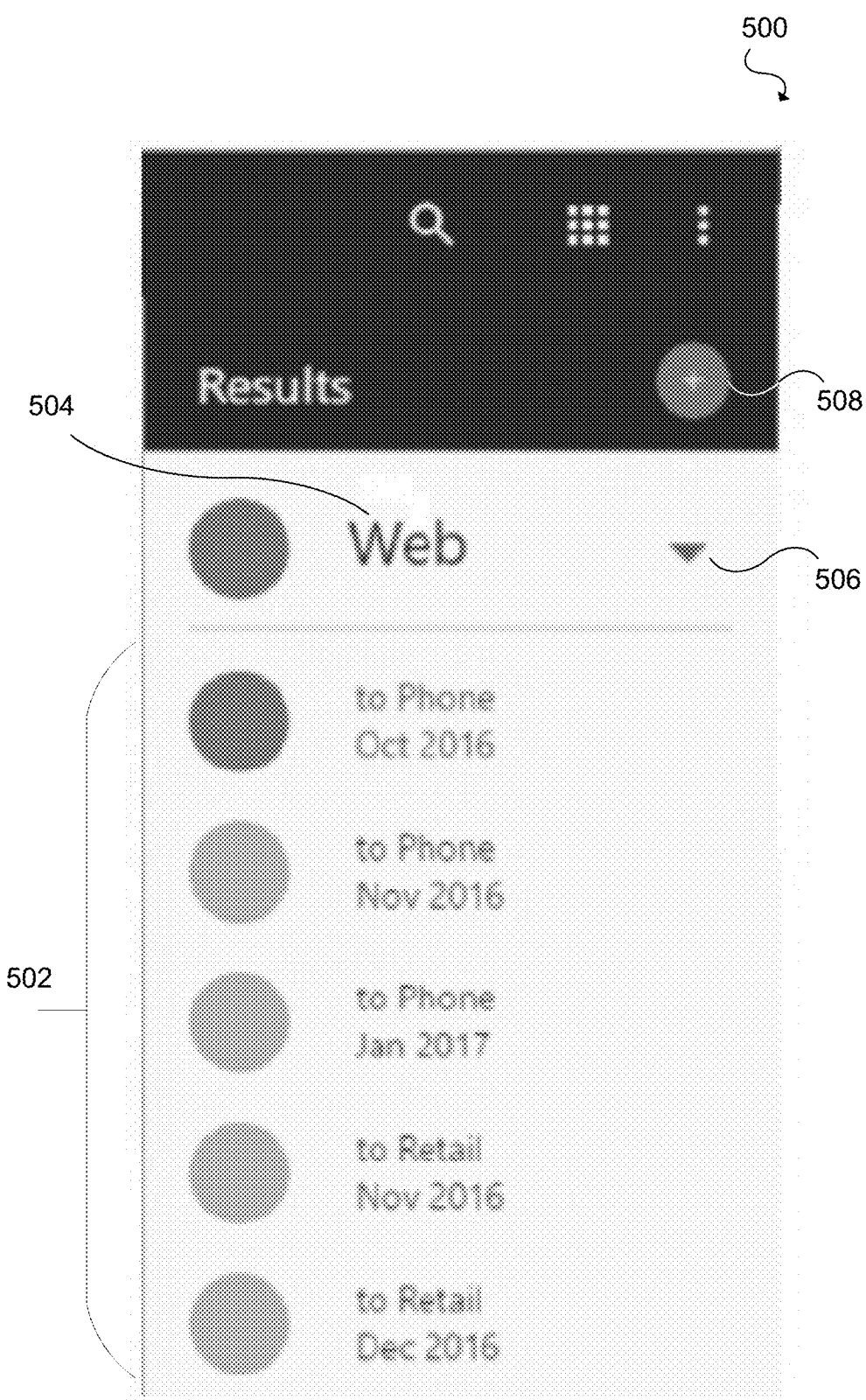
FIG. 5 is an example off-canvas menu for locating previously-saved results files, in accordance with some embodiments of the present disclosure.

In some embodiments and as shown in FIG. 4, a digital-channel-to-analyze menu bar 408 may provide options for a user to specify which channels the DCAS is to analyze. For example and not limitation, a user may specify the channels as Web, Mobile, Interactive Voice Response ("IVR") system, ATM, a general category ("other"), or any other channel known to be represented within the file. In some embodiments, an upload screen 400 may display attributes of processed files 410 that are locally available to the user (e.g., channel, file name, file size, upload date, or any other attribute). As shown, the system may provide a method for receiving a selection of one of the displayed and available files, for example by providing a check box 412, as shown in the figure. In some embodiments, the system may provide an off-canvas menu icon 414, which may display an additional screen providing results from previously-saved results spaces (an exemplary additional screen is shown in FIG. 5). In the exemplary embodiment depicted in FIG. 4, the system is set to receive a new raw data file, as shown by the highlighting of the Raw Data tab 404. The upload steps shown in FIG. 4 and described herein are an exemplary realization of the upper left box in the high-level architecture diagram shown in FIG. 3, including the user 302 and the steps 306/314 taken by the user.

FIG. 5 is a detailed view of an example "Off-canvas" menu 500 used to easily switch between previously saved results spaces, according to some embodiments of the present disclosure. In some embodiments, the system may provide previously-saved results 502 from various channels, e.g., previous "Web" results 504 as shown in the figure. The system may provide additional channels under a pulldown menu 506. In some embodiments, the system may include the previous results in the current analysis if an add-to results button 508 is selected.

Figure 6:
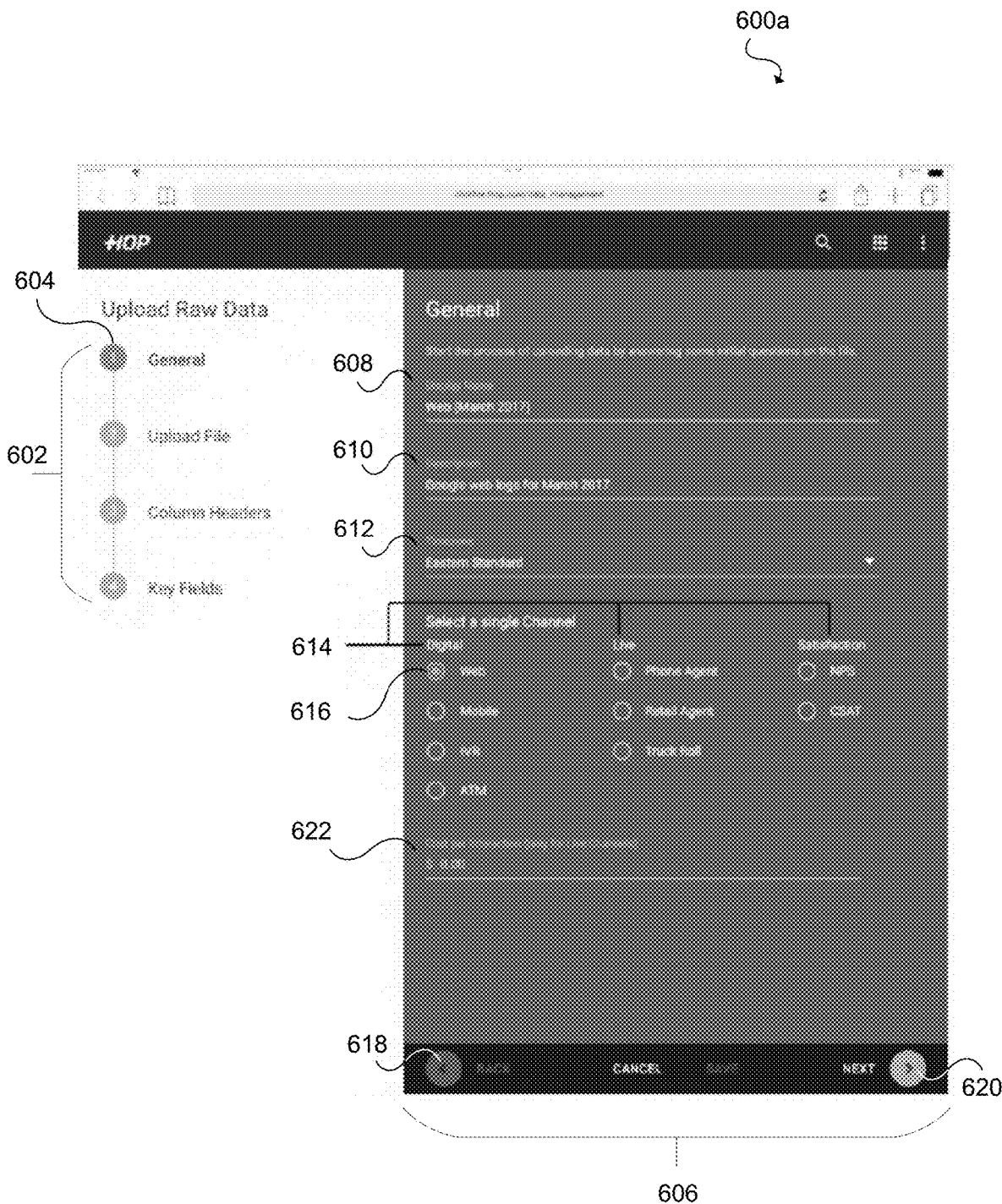
FIG. 6 is an example interface allowing a file to be renamed before processing, in accordance with some embodiments of the present disclosure.

FIG. 6 is an exemplary screen that may be presented when a user selects the "Upload File" option 407 (visible in FIG. 4), according to some embodiments of the present disclosure. In some embodiments, selecting the "Upload File" option 407 may present an upload raw data screen 600a, shown as the "General" step in FIG. 6. In some embodiments, the system may display each step of the processes in a progression bar 602, and the progression bar 602 may indicate which step is currently being displayed in the graphical user interface (e.g., step 1, or "general" 604 as shown in FIG. 6). The system may highlight the user's current progress through the DCAS with color highlighting on the step number (e.g., a highlighted step "1") or by any other method. The remaining steps may be grayed out for contrast.

In some embodiments and as shown, a General-step panel 606 may be displayed in an upload raw data screen 600a. The system may begin the process of receiving the uploaded data by receiving descriptors for the dataset. Since file names themselves may not properly describe the contents of the file or the application of the file, a more descriptive or simplified display name may be specified. For example and not limitation, the system may provide fields to receive a display name 608, a more detailed dataset description 610, or any other description fields that may be beneficial in the interface, as will be appreciated. In some embodiments, the system may provide a time zone selection menu 612, which may be beneficial when data from multiple sources or channels do not have matching time zone specifications. In some embodiments, channel categories 614 may be listed, and the system may allow a user to select the channel the data best represents (e.g., by selecting a corresponding radio button or check box, like the selected radio button for "Web" 616 shown in the figure). In some embodiments, various choices for channels may be provided for different channel sources, for example and not limitation: "digital" channels, "live" channels, and/or "satisfaction" channels. "Digital" channels may include but are not limited to Web, Mobile, IVR, ATM, or any other digital channel. "Live" channels may include but are not limited to Phone Agent, Retail Agent, Truck Roll, or any other digital channel. Additionally, a "satisfaction" channel may include but is not limited to Net Promoter Score ("NPS"), Customer Satisfaction ("CSAT"), or any other satisfaction measure. In some embodiments, the system may display navigation buttons to allow a user to move from the current step in the process to a previous step (e.g., by pressing a back button 618, although a previous step is not available here as this is step "1" in the presently shown embodiment) or to a subsequent step (e.g., by pressing a next button 620).

In some embodiments, an additional field may be provided to set the interaction cost for various channels. For example, in some embodiments the interface may provide an interaction cost field 622 where a user may indicate the cost of each interaction. As will be appreciated, this feature may be of particular value for "live" channel interactions, because the exact cost of each live interaction, for example a call to an agent, is ascertainable. The systems described herein allow a user to input a cost of the particular interaction, and the systems allocate that cost to each interaction within the dataset—thus providing insight into the cost of the hop from digital to live channels. Each of these steps all allow the system to receive the general characteristics of the uploaded file. When the systems have received the information required for the step, a user may select the next button 620 to proceed to a subsequent step, for example the step shown in FIG. 7.

Figure 7:
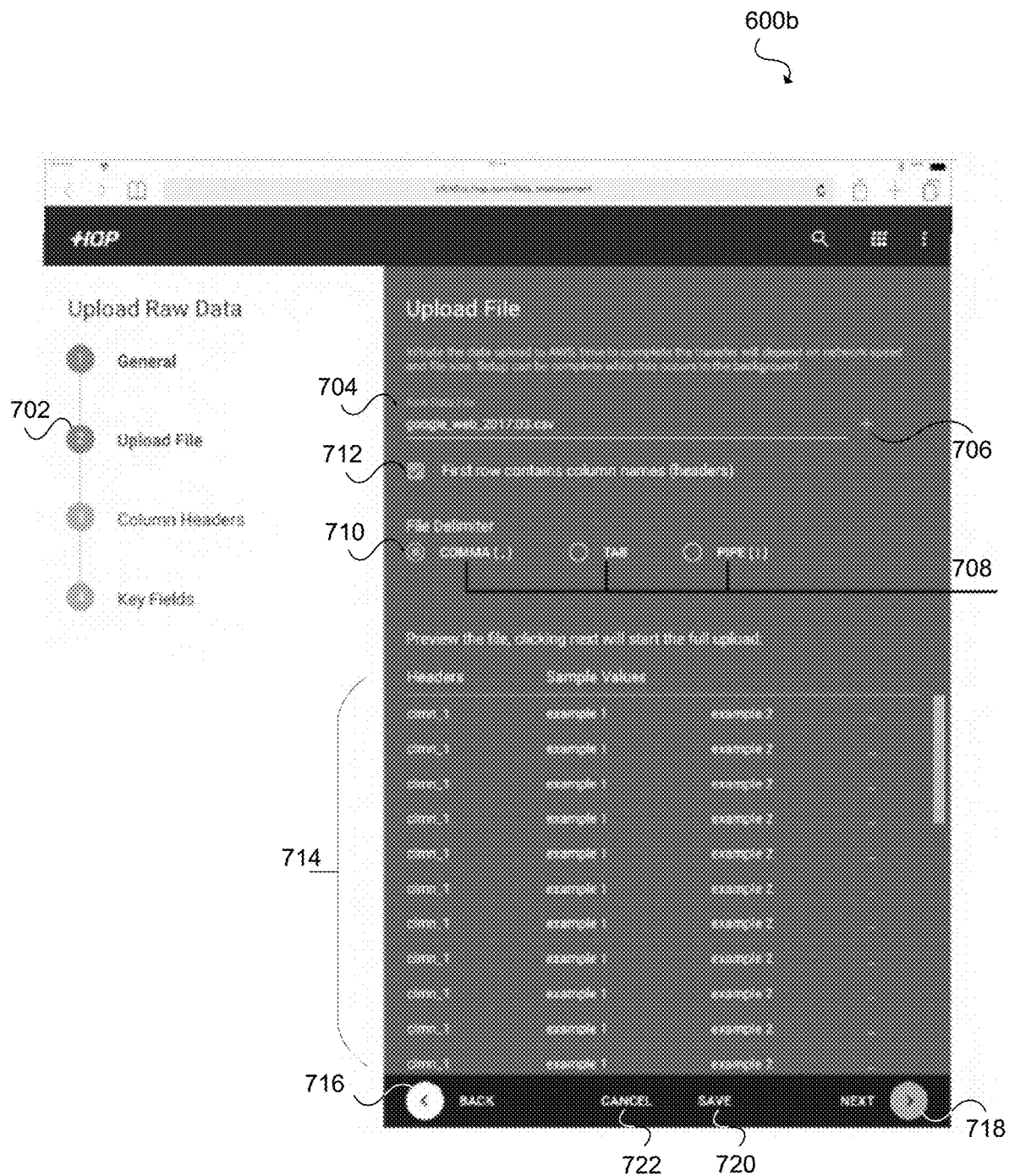
FIG. 7 is an example upload-file interface, in accordance with some embodiments of the present disclosure.

FIG. 7 is an exemplary second step in the "Upload Raw Data" process, according to some embodiments of the present disclosure. In some embodiments and as shown, the second upload raw data screen 600b may be an "Upload File" step. As described above, the interface may indicate which step of the process is currently displayed, for example step "2" or "Upload File" 702. The disclosed systems and methods can handle exceedingly large input files, and the upload can commence while the user continues specifying the data properties in the subsequent upload steps. For example, in some embodiments, once the system receives a file to upload 704, a user may direct the system to begin browsing the filesystem (e.g., via browse filesystem button 706). In some embodiments, the system may provide common file delimiter options 708 (which may be selected, for example, by radio buttons 710 or any other method, as will be appreciated). In some embodiments, the system may provide a method for a user to indicate if the first row in the filesystem includes column names (i.e., headers), for example by providing a header check box 712.

In some embodiments, the system may provide a file preview window 714, which may contain a truncated representation of the data contained in the file. The system may produce this economical view by transposing the rows and columns in the data file. This feature may expedite the upload process by enabling all processing in-application. The feature may also serve to reduce human input error as the user can verify which columns will be input data sources for the analytics, thus enhancing the fidelity of the system and enhancing user experience. In some embodiments, the file preview window 714 may contain columns showing values for headers and sample values from the first few non-header data rows. The system may also provide navigation buttons, as described above, to return to a previous step (back button 716) or proceed to a subsequent step (next button 718) in the system. The next button 718 may start the upload process and confirm to the system that all values have been specified. In some embodiments, the user may choose to save their progress so that the user may return to the data in a later session (e.g., via save button 720). In some embodiments, a user may choose to abandon the analysis (e.g., via cancel button 722). The upload process may begin at the conclusion of this "Upload File" 702 step. In some embodiments, the user has additional opportunities to specify the requisite meta information—such as the file headers (shown in FIG. 8) or the key fields to use in merging (shown in FIG. 9)—about the file while that process happens. The steps in the exemplary system shown in FIG. 7 correspond to the "upload metadata" swim lane 315 in FIG. 3 and the steps within the Management layer 204, Storage layer 206, and Processing layer 208 in the exemplary high-level flow depicted in FIG. 2.

Figure 8:
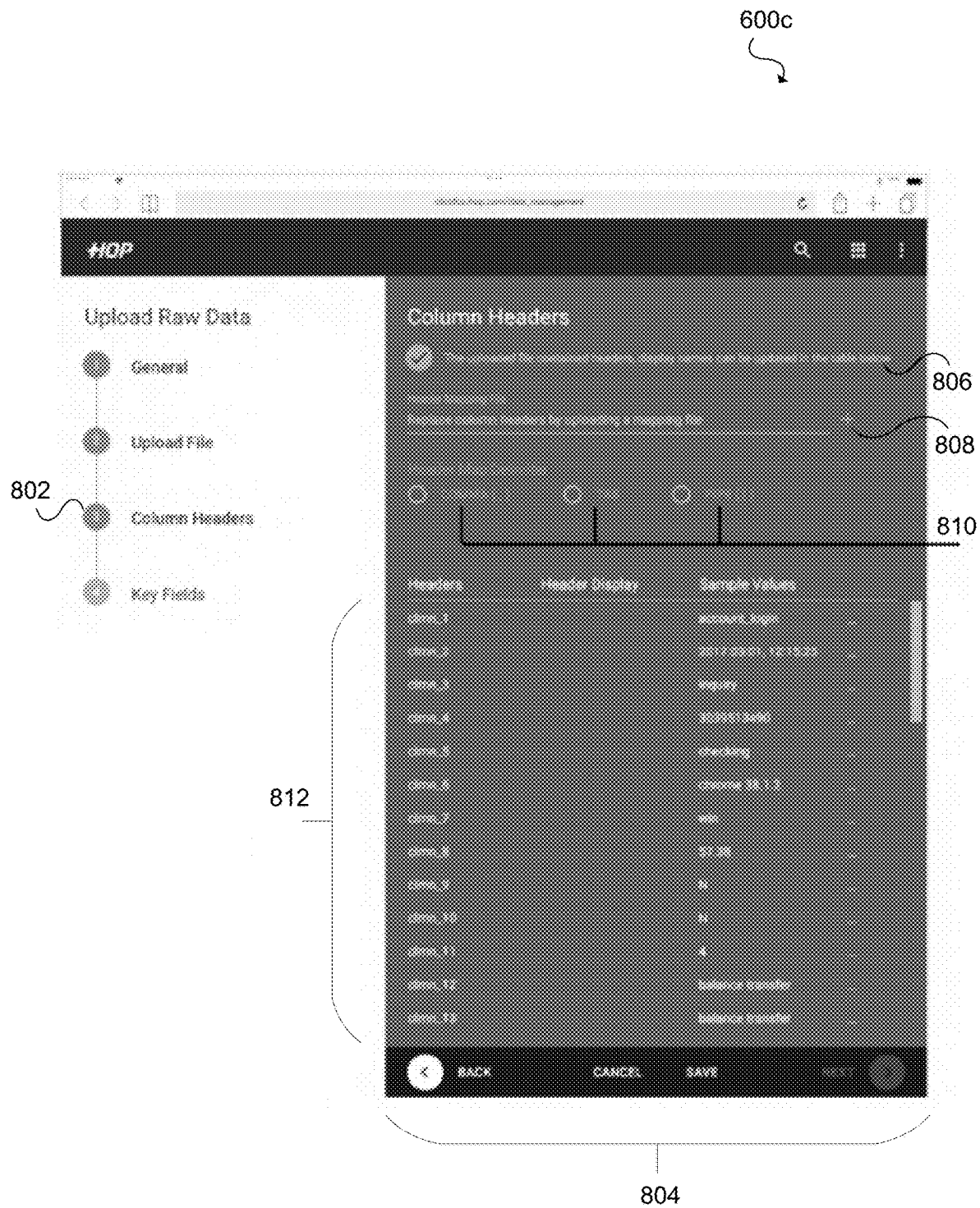
FIG. 8 is an example interface for defining the columns within an uploaded file, in accordance with some embodiments of the present disclosure.

FIG. 8 is an exemplary third step in the "Upload Raw Data" process, according to some embodiments of the present disclosure. In some embodiments and as shown, the third upload raw data screen 600c may be a "Column Headers" step. As described above, the interface may indicate which step of the process is currently displayed, for example step "3" or "Column Headers" 802. In some embodiments, this step provides an opportunity to specify the column headers in the file to be uploaded. A new Column Headers pane 804 may be displayed at this step. In some embodiments, the system may detect when non-numeric values exist in the first row of the uploaded data file. In such an embodiment, it may be beneficial to include a message, for example message 806, indicating the file includes these non-numeric values. The exemplary message 806 in FIG. 8 indicates, "The uploaded file contained headers, display names may be updated in the table below." These column headers may represent fields within the datasets. These fields may be certain categories of information about the file. For example, the fields, or column headers, may include web page names, dates, times, call reasons, products for which the events is based, and any other type of field. In some embodiments, the system may receive a header mapping file containing (i) the names present for the column headers and (ii) a more descriptive name to replace the given names for display purposes. In some embodiments and as shown, this mapping file may be received in a browse filesystem field 808. A mapping file that recategorizes the names present in the file to desired names can save time and provide clarity when a user is preparing a file that is similar to a file previously prepared. Although the message 806 and the browse filesystem field 808 may simplify and clarify the columns in the data set, they are not necessary for any of the systems described herein. For example, a user may manually type in each column header or sample value.

In some embodiments, the system may include a delimiter option pane 810 for receiving input about which character, in the file, is used to delimit the mapping. The options may include but are not limited to selecting a comma, tab, and/or pipe symbol. In some embodiments, the system may display the truncated versions of each header within the file, along with the header names either uploaded or manually received, in a header preview pane 812. The steps in the exemplary system shown in FIG. 8 correspond to the writing of metadata into raw files 326 step in the "upload metadata" swim lane 315 in FIG. 3. The steps in the exemplary system shown in FIG. 8 also encompass various aspects of the processing represented by (i) the Create HOP definition 222 stage and (ii) the Generate HOP object 224 and the data quality processing 236 in FIG. 2.

Figure 9:
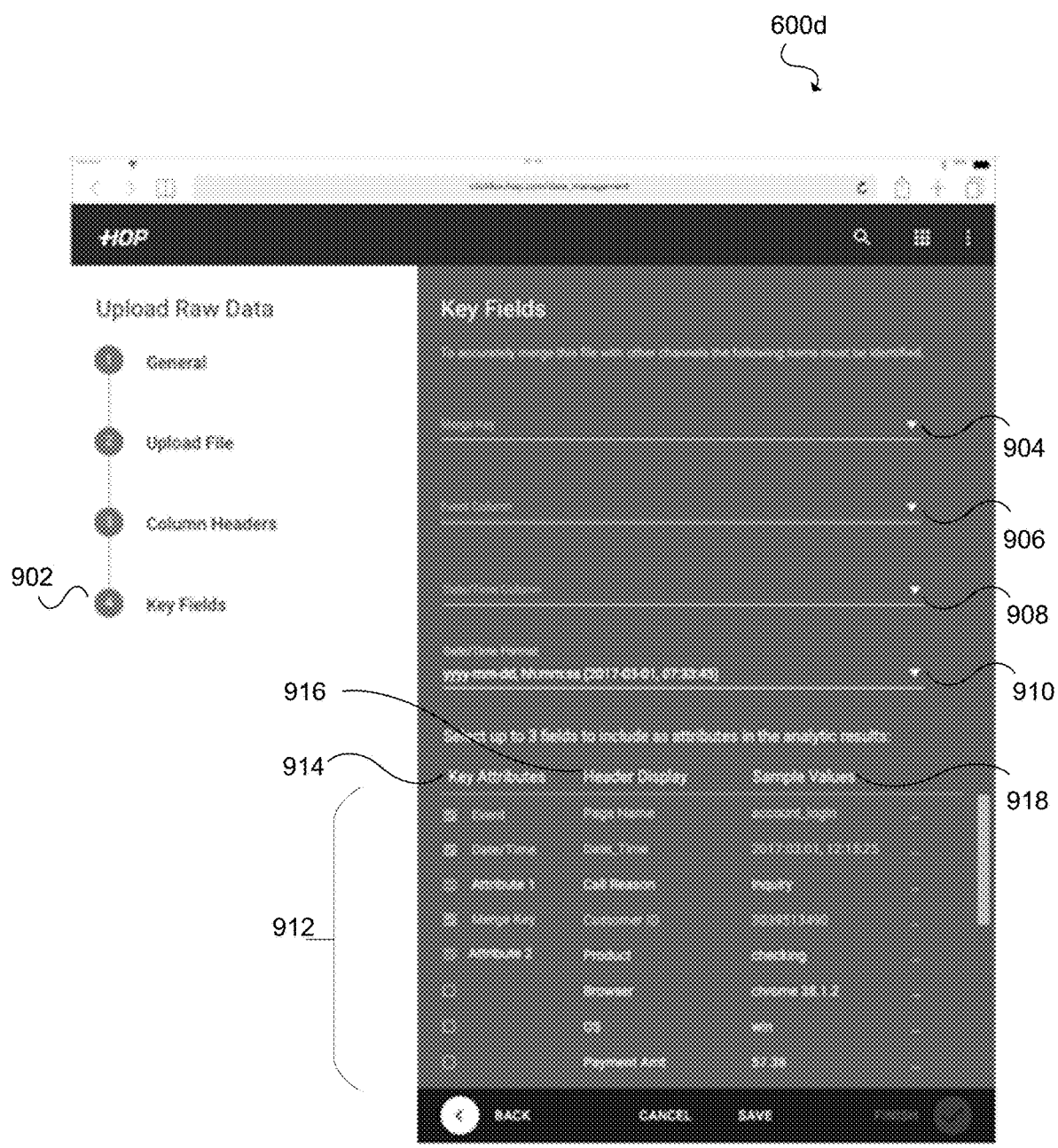
FIG. 9 is an example interface for defining the key fields, such as a merge key, within an uploaded file, in accordance with some embodiments of the present disclosure.

FIG. 9 is an exemplary fourth step in the "Upload Raw Data" process, according to some embodiments of the present disclosure. In some embodiments and as shown, the fourth upload raw data screen 600d may be a "Key Fields" step. As described above, the interface may indicate which step of the process is currently displayed, for example step "4" or "Key Fields" 902. In some embodiments, the systems may receive technical specifications for combining the present file (i.e., the file provided in FIGS. 6-8) with another file at this step. The exemplary interface shows drop-down fields for Merge Key 904, Event Column 906, Date/Time 908, and Date/Time Format 910, which is in accordance with some embodiments and not exclusive of all possible drop-down fields. Each of these drop-down fields provide the system with the specifications needed to allow the present file to be combined (or merged) with another file. In some embodiments, the Merge Key 904 field is the column or columns within the file that the user wishes to use to combine the two datasets. For example, the Merge Key 904 field drop-down menu may include any of the headers defined herein (e.g., page name, date and/or time, call reason, customer identification number, etc.) Therefore, in some embodiments, the system may combine the two resultant files using the attributes of the Merge Key 904. In some embodiments, the system may include a drop-down menu, for example Event Column 906, for receiving input as to which column within the dataset (e.g., the columns such as the "headers" column in FIG. 8) contain the Merge Key 904. The Event Column 906 drop-down may be populated from the items defined in the previous steps. In some embodiments and as shown, the system may include an attribute inclusion pane 912 to receive input of key attributes 914 to include in the analytical results. For example and not limitation, the attribute inclusion pane 912 in the present figure includes key attributes 914 for "Event," "Date/Time," an arbitrary "Attribute 1," an arbitrary "Merge Key," and a secondary "Attribute 2." The attribute inclusion pane 912 may display the header names 916 for each key attribute 914. For example, an attribute 914 called "event" may have a header name 916 "page name" for web channels. Additionally, a value 918 for each header name 916 is displayed in the present figure, which is in accordance with some embodiments. For example, a header name 916 called "page name" may include a sample value 918 of "account_login."

These previous stages of user-specified information (depicted in FIGS. 4-9) represent the end of the Create HOP definition 222 stage in the Management layer 204 of FIG. 2. When the system receives all input files and receives all associated elements and descriptors for the distinct events within the files, multiple files may be merged for analysis. For example and not limitation, one file of a web channel may be merged with one file of a live channel. This merging commences the Generate HOP object 224 stage of the Processing layer 208 in FIG. 2. This Generate HOP object 224 process encompasses several potential transformations that can be made on the datasets provided to the systems and methods described herein. In some embodiments, the end-user may provide unique identifiers that define the data, thereby indicating which fields within the data should be associated with each other when combined. The systems and methods may then complete the associations and transformations in subsequent operations in the Processing layer 208 in FIG. 2.

In some embodiments, the associations and transformations may be based on unique fields present in the data file(s) or specified in the meta-information, thereby facilitating the combination of the datasets representing two or more data sources. In some embodiments, the files may contain customer website page visits or a digital representation of any format representing call-center agent-customer interactions. The transformations performed by the systems and methods may include, but are not limited to in any embodiment, merging the time-based events into a single file-like object, which may reside either in computational memory or saved to a file storage medium either locally or on a remote data store. This merging, or cross-channel association, may be based on criteria specified by the end-user through a user interface, for example the interfaces described in the discussion for FIGS. 4-9. In some embodiments, the present technology may pre-process the input data once the input data is fully defined. In some embodiments, this pre-processing may produce correlation information between the number of joined events from each channel and between a plurality of time periods or windows. The systems described herein may later summarize, reference, and present a recommended time-period for which events from one channel may be connected to or associated with events from another channel.

In some embodiments, once the disparate channel data is associated, events from one channel may be causally connected to the events from another channel, based on user-specified criteria. An exemplary embodiment in this instance would be information originating from a digital interaction source, such as a website or mobile application, being connected to an in-person interaction source, such as data from a support call center or a physical store. Although multiple manners exist to connect these datasets, one exemplary method would be to join events from the former channel to events in the latter channel by specifying a unique customer identification number to perform the combination or merging. In some embodiments, this unique customer identification number may be generated by the system using any of the methods discussed above. For example and not limitation, the metadata from the different channels may provide insight into who the customer is, thereby allowing the system to create the customer identification number. As will be appreciated by those of skill in the art, the metadata used for this identification may include timestamps, (Internet Protocol) IP addresses, or any other metadata within the files. In some embodiments, this intermediate data source may form the basis for additional calculations and computational processing. These combined sources that describe the customers' journeys may be further processed to provide higher fidelity information than is typically available through simply connecting the disparate channel information.

In some embodiments, the systems and methods described herein may process the journey information in a way which separates or dissociates the sequential information provided by the previous processing steps described herein into indirect combinations of sequenced event. At the same time, however, the systems and methods are also capable of preserving the observed order of the events present in the entire set of events present in the journeys. This preservation of the order of events allows the systems to conduct advanced statistical measures and metrics upon the ordered events. In some embodiments, the process that performs these transformations has logical connections to both the Storage layer 206 and the Presentation layer 210 of the application system environment (as seen in FIG. 2), as the object will be potentially loaded and/or saved as well as visualized or otherwise interacted with. The Generate presentation files 232 stage depicted in the Processing layer 208 in FIG. 2 encompasses additional transformations that are capable in the presently described systems and methods. These additional transformations include, but are not limited to, appending tags or attributes necessary for tracking event information, format conversions, and/or the application of additional rules at runtime.

These advanced measures are designed to offer novel and valuable insights into the various customer journeys. For example, in some embodiments, the disclosed systems and methods can assemble and collect these combinatorics calculations by the sequence of events that precede a given subsequent event, thus providing appearance counts of when that sequence appears prior to the given subsequent event and when it does not. As will be appreciated, the ratio of the number of times a sequence or single event appears prior to a selected event as compared to the number of times in which that same sequence or single event appears without the subsequent selected event forms the basis of a basic probability. In some embodiments, the system may use this foundational probability in a number of additional applications. As will be appreciated, the foundational probability may be used in a forward-looking manner or a backward-looking manner. In general, a forward-looking (i.e., predictive) probability is the probability of seeing another specific event given that the current one has occurred. Conversely, a backward-looking (i.e., explanatory) probability is the probability that the preceding event or sequence was observed given the current event has occurred. In some embodiments, the disclosed systems and methods can use these calculated probabilities in the context of a sub-proportion of the larger statistical set and a base proportion of the statistical sample to achieve additional metrics. One such example is the statistical lift, which is a measure that conveys the likelihood of a sequence of preceding event(s) occurring relative to the base population or random sampling of the set. These probability-based measures or metrics are independent of the number of occurrences of a given sequence in a dataset, and thus these measures can be a useful addition to aid in decision-making across a broad range of possible datasets.

Embodiments of the systems and methods can further define another advanced measure that mathematically combines the number of times an event happens (or volume) with the statistical lift. As will be appreciated, such probability-based measures represent a substantial advancement in fidelity—providing dramatically improved insights over current systems. These advanced measures go beyond calculating the so-called "digital containment rate" of the dataset and afford insights into the fundamental driving mechanisms of the digital containment problem. This information is neither equivalent to a simple accounting of events in a merged dataset, nor is it derivable from such a set, and rather relies on the presently disclosed systems and methods to be achieved. In addition to this, as can be appreciated by one skilled in the art of data management and transformations, these advanced statistical measures and metrics also rely materially on the proper data architecture present in the SEF as a result of the merging and transforming of the constituent plurality of data feeds.

Figure 10:
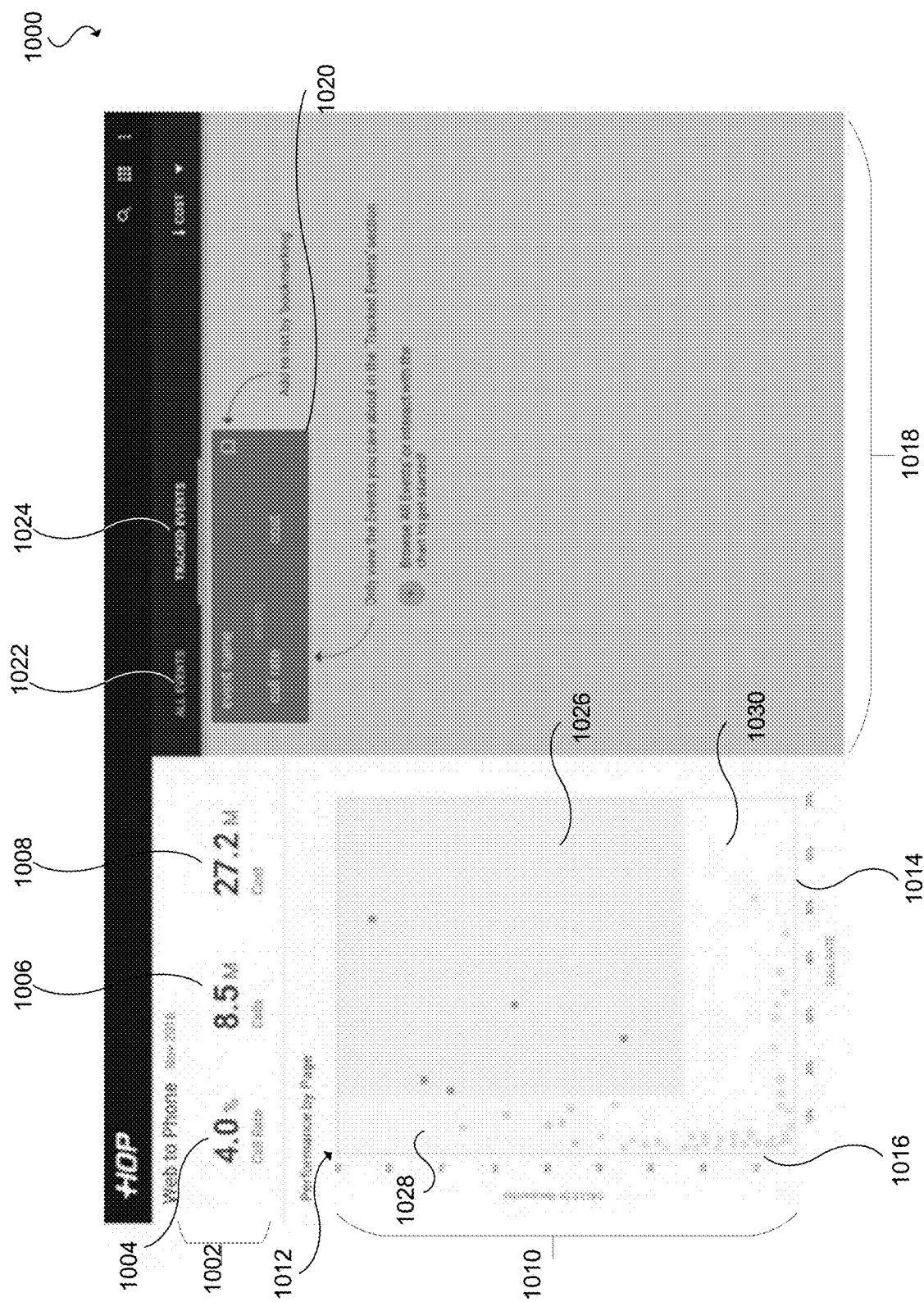
FIG. 10 is an example event discovery interface, in accordance with some embodiments of the present disclosure.

FIG. 10 is an exemplary event discovery interface 1000, according to some embodiments of the present disclosure. According to some embodiments, after the systems merge the datasets of the two or more sources and calculate the advanced metrics and measures described herein, the systems may present an event discovery interface 1000 that provides an understanding and prioritization of the returned data products. In some embodiments, the data products displayed in the event discovery interface 1000 may be depicted as digital containment events. An event discovery interface 1000 may comprise a summary metrics panel 1002, which in some embodiments may display the metrics for this digital containment analysis (i.e., this HOP object). These metrics may correlate to the channels within the system. For example, the exemplary event discovery interface 1000 of FIG. 10 includes a live phone channel, and the summary metrics panel 1002 displays a call rate 1004, a total number of calls 1006, and a total phone-center cost for this period 1008, which is in accordance with some embodiments. The call rate 1004 may refer to the average amount of call volume experienced by a call center in the exemplary embodiment, per desired unit time. The total phone-center cost for this period 1008 may be calculated from the input received at the interaction cost field 622 (described in the discussion for FIG. 6).

In some embodiments, the summary metrics panel 1002 may provide an interactive chart pane 1010, which may display individual events as they project onto a performance chart 1012. In some embodiments, the performance chart 1012 may comprise axes corresponding to the type of data within the channels. For example, in an analysis containing data from a live call channel, the X-axis 1014 may include a call rate (defined above) and the Y-axis 1016 may include the total number of calls for that particular event.

In some embodiments, the event discovery interface 1000 may further display an events panel 1018 that provides individual event cards 1020. An event card 1020 may display the individual metrics for a specific event within the performance chart 1012. For example, a user may select one of the individual plotted events within the performance chart 1012 for individual analysis. In some embodiments, the event card 1020 may display the name of the event, the call rate, the cost, or any other metric defined herein. In some embodiments, the events panel 1018 may provide a method of displaying all events within the performance chart 1012 or only those selected, or tracked, from the chart for individual analysis. In some embodiments, the system may divide the events by providing an "all events" tab 1022 and a "tracked events" tab 1024.

Referring to the exemplary interface in FIG. 10, the event discovery interface 1000 shows a system displaying only the tracked events within the "tracked events" tab 1024, indicated by only showing one event card 1020, despite a plurality of events being plotted on the performance chart 1012. Also shown in the exemplary event discovery interface 1000 is a performance chart 1012 with three simple, distinct regions of varying importance. In some embodiments and as shown, a performance chart 1012 may comprise a high-priority region 1026, which depicts the events that may be of concern to the user of the DCAS. A high-priority region 1026 may be highlighted by any method indicating which region the systems define as high priority. For example, this region may be highlighted by a color (for example by shading the area in light red, as shown in FIG. 10). A second region may be a medium-priority region 1028, which may similarly be highlighted by a method, such as being highlighted by a color (orange in the figure). In some embodiments, the medium-priority region 1028 may contain points representing the values of the events, which contain both higher values for the total calls as well as the lesser values of the call rate in the present embodiment, which is in accordance with certain embodiments. Again, this region may be defined by the DCAS as medium-priority based on the metrics and measures described herein. Finally, a low-priority region 1030 may be presented outside of the other two regions.

In some embodiments, the points (or events) within each respective region 1026/1028/1030 may be displayed in the performance chart 1012 such that the events in a given region are easily identifiable. For example, all events within the high-priority region 1026 may be shown as a dot in a first color, while the events within the medium-priority region 1028 may be displayed as a dot in a second color. Other embodiments exist to provide a visual prioritization scheme for the different regions within a performance chart 1012. In some embodiments, the visual prioritization scheme may be represented by colored backgrounds and/or colored points (either corresponding or contradicting colors) which comprise contours. In some embodiments, the prioritization may be a color scheme whereby the colors smoothly or discretely change from low to high priority. Any number of colors or gray scale may be used, and the colors or greyscale may become lighter or darker with increasing or decreasing priority. Examples of such embodiments are shown in FIG. 11.

Figure 11:
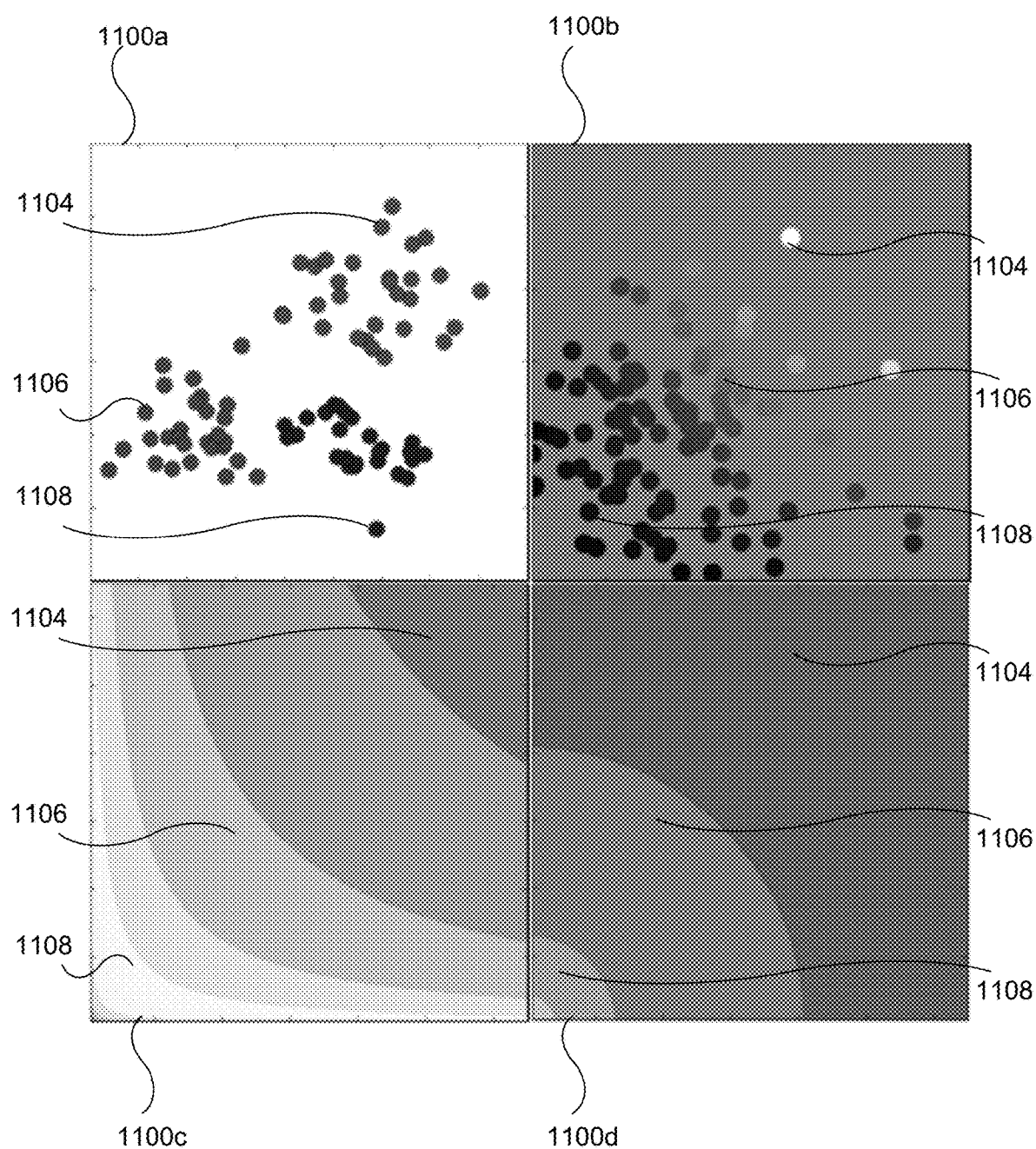
FIG. 11 is an example of four distinct variations of a visual prioritization scheme in a performance chart, in accordance with some embodiments of the present disclosure.

FIG. 11 depicts four variations of a visual prioritization scheme for a performance chart, according to some embodiments of the present disclosure. In the figure, each performance chart (1100a/b/c/d) is a variation of the performance chart 1012 of FIG. 10. Each of the visual prioritization schemes shown utilize a different technique to indicate events of high-importance 1104, medium-importance 1106, and low-importance 1108. In addition to the exemplary images shown, other methods can be used to differentiate the data points that are present in a performance chart. In some embodiments, these methods may be purely visual in construction and presentation within the interface. In some embodiments, the methods may be displayed, arranged, or otherwise presented to an end user based on the output of algorithms previously described. These algorithms may assign a position in the chart or a color to either the background or the points themselves. According to some embodiments, this color assignment may be based on the raw, intermediate, or final outputs of the processing performed by the presently disclosed system and methods. Visualization methods such as these may take the intermediate results calculated by the DCAS and enhance the results' utility by adding statistical context. In some embodiments, the visual prioritization may use methods other than highlighting with contrasting color or greyscale. For example, in some embodiments, higher priority events may be distinguished from lower priority events by altering the shape of the events represented on the performance chart 1100a/b/c/d. For example and not limitation, events of high-importance 1104 may be shown as larger spots on the performance chart 1100a/b/c/d, and the size of lower-priority events may decrease in relation to their importance.

Figure 12:
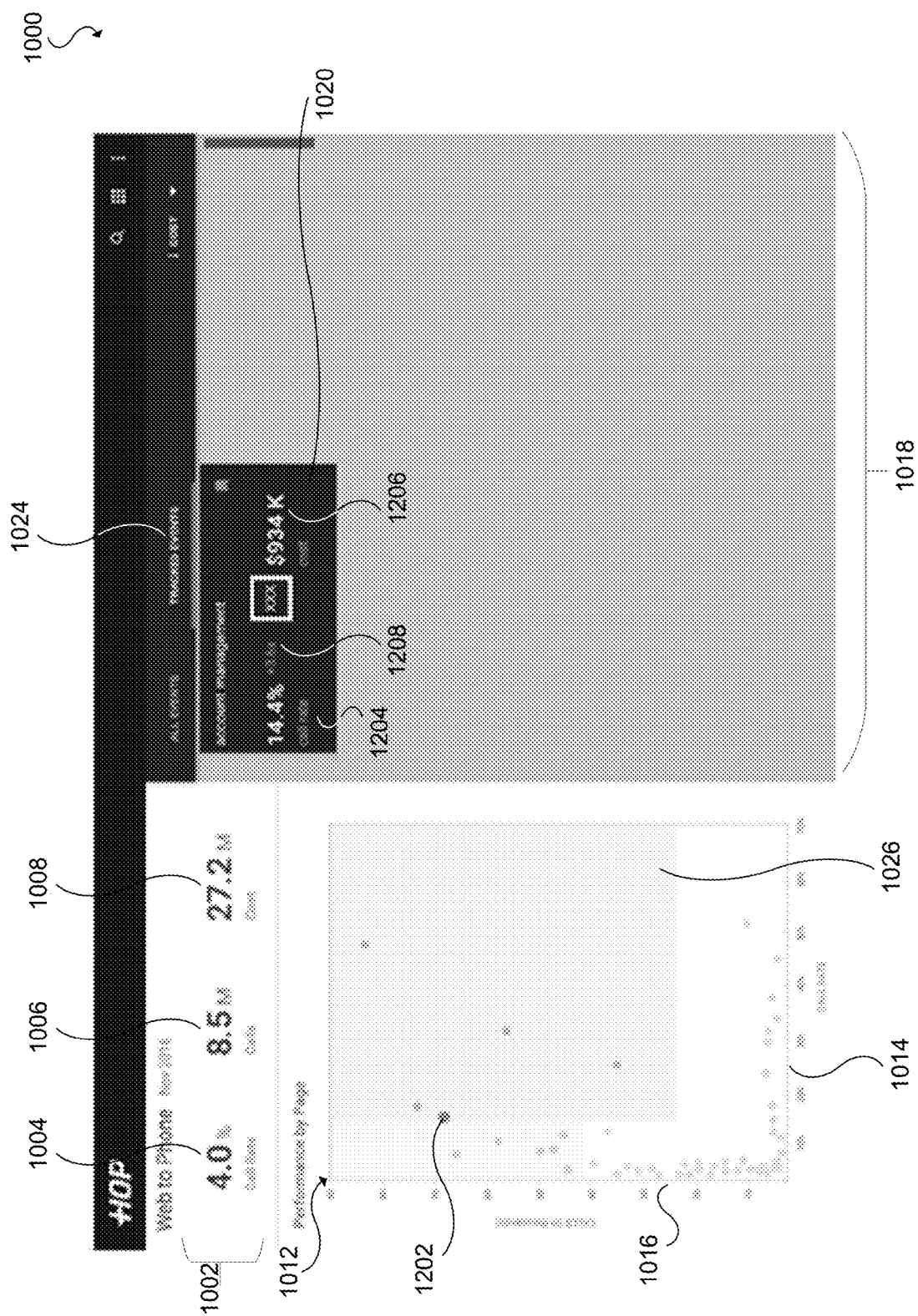
FIG. 12 is an example event discovery interface showing a selected event added to a tracked-events tab, in accordance with some embodiments of the present disclosure.

In some embodiments, when additional, advanced metrics and measures are available for a given set of data, the measures and metrics may be used to sort the information presented in an event card 1020 (shown in FIGS. 10 and 12). The systems described herein may also use the additional metrics and measure to graphically prioritize the information in a manner consistent with visual prioritization methods shown in FIG. 11. These methods allow end users to prioritize their time in analyzing the results calculated by the DCAS. In some embodiments, these prioritizations can take the form of color-coding the points representing the events. For example, the colors of the points may be governed by the position of the point relative to a fixed grid, with a plurality of distinct regions. The system may prioritize the output in a custom manner (1100a), in a linear manner (1100b), in an inverse manner (1100c), or the prioritization may be quadratic (1100d). As will be appreciated, other representational models exist to provide the visual prioritization.

In some embodiments, the user can configure or request the software configure the position of the points such that regions of varying analytical interest are grouped and highlighted. In some embodiments, points may be divided in to distinct but general groups (e.g., high-importance 1104, medium-importance 1106, and/or low-importance 1108). In some embodiments, the distinct groups may be labelled by any of the methods described herein, including color highlighting or highlighting by shape. For example, in one exemplary performance chart 1100a, the high-importance 1104 items—which possess larger values in both the horizontal and vertical axes—may have variables depicted in red. The events the system defines as medium-importance 1106 (depicted as green events in the first exemplary performance chart 1100a) are those possessing lower abscissa values but higher ordinate values. The events the system defines as low-importance 1108 (depicted as blue events) are those possessing higher abscissa values and higher ordinate values but in aggregate less than the high-importance 1104 items. Additional embodiments may color-code the points differently. The precise ordering of these importance-groupings may change depending on the particular business problem being solved. The performance charts 1100a/b/c/d shown are exemplary, and the methodology is not limited to any of these groupings.

Another exemplary performance chart 1100b is a prioritization system based on characteristics that vary smoothly across the chart, and the smooth variation across the chart may be illustrated by the increasing lightness of the point for when either the abscissa or ordinate values increase. This methodology differs from the methodology of previously-described performance chart 1100a. These exemplary embodiments show that the presently disclosed systems and methods are not limited to a background of constant hue, color, or brightness, because rich datasets containing a plurality of additional data characteristics can be incorporated to fill a performance chart 1100a/b/c/d with additional insightful representations. Another exemplary performance chart 1100c is a prioritization system that spans from the origin of the chart (bottom left) according to a mathematical expression whereby points closer to either axis will possess similar importance and locations away from the axes will increase in importance. Again, labels of high-importance 1104, medium-importance 1106, and low-importance 1108 are not a reflection of a limitation in how an embodiment prioritizes the importance of the events in the chart; rather, the labels help to convey the gross direction of increasing importance. Another exemplary performance chart 1100d comprises a background that is colored or similarly conveys priority based on mathematical shape and may use inherent properties, such as color, saturation, brightness, or transparency.

FIG. 12 is an exemplary event discovery interface 1000 shown after a selected event 1202 is added to a "tracked events" tab 1024, according to some embodiments of the present disclosure. In some embodiments, an event card 1020 may be populated in an events panel 1018 once an end user selects a selected event 1202 from a performance chart 1012. In some embodiments, after a selected event 1202 is chosen, the systems and methods may perform the operations seen in the Presentation layer 210 of FIG. 2. The exemplary event discovery interface 1000 may include a summary metrics panel 1002 that may indicate the results returned for the entire merged set. In some embodiments, the summary of the results provided in a summary metrics panel 1002 may be the metrics calculated by the DCAS at the Generate HOP object 224 stage in the Processing layer 208 of FIG. 2. In some embodiments, a selected event 1202 may be shown in the events panel 1018 and also be highlighted in the performance chart 1012, e.g., by highlighting the selected event 1202 in a color or by any other highlighting method described herein. Tracking a selected event 1202 may be useful by providing feedback on (i) which events the user deems to be important and (ii) where the events fall in relation to all merged events within the datasets.

Referring to the exemplary interface in FIG. 12, a selected event 1202 is shown to fall close to the edge of an identified high-priority region 1026. In this exemplary embodiment, the user may wish to select the selected event 1202 because of where the event is positioned within the performance chart 1012. For example, the relationship of the exemplary selected event 1202 to the other plotted events shows that it is ranked third in total calls (third highest event along the "calls axis," or Y-axis 1016) and is ranked fourteenth in call rate (fourteenth highest event along the "call rate axis," or X-axis 1014). In some events, the event card 1020 may provide additional metrics for the selected event 1202. For example and not limitation, the event card 1020 may provide the selected event's 1202 individual call rate 1204 (defined herein) and/or total cost 1206 (defined herein) for the selected cross-channel hop. The event card 1020 may also include additional metrics, including but not limited to lift, total number calls, or any other metric that may be valuable to the end user of the systems and methods. For example, the exemplary events panel 1018 in FIG. 12 provides an event card 1020 showing a calculated statistical lift 1208, which represents the likelihood of the event within the event card 1020 happening compared to the likelihood of hopping channels across the entire merged dataset.

Figure 13:
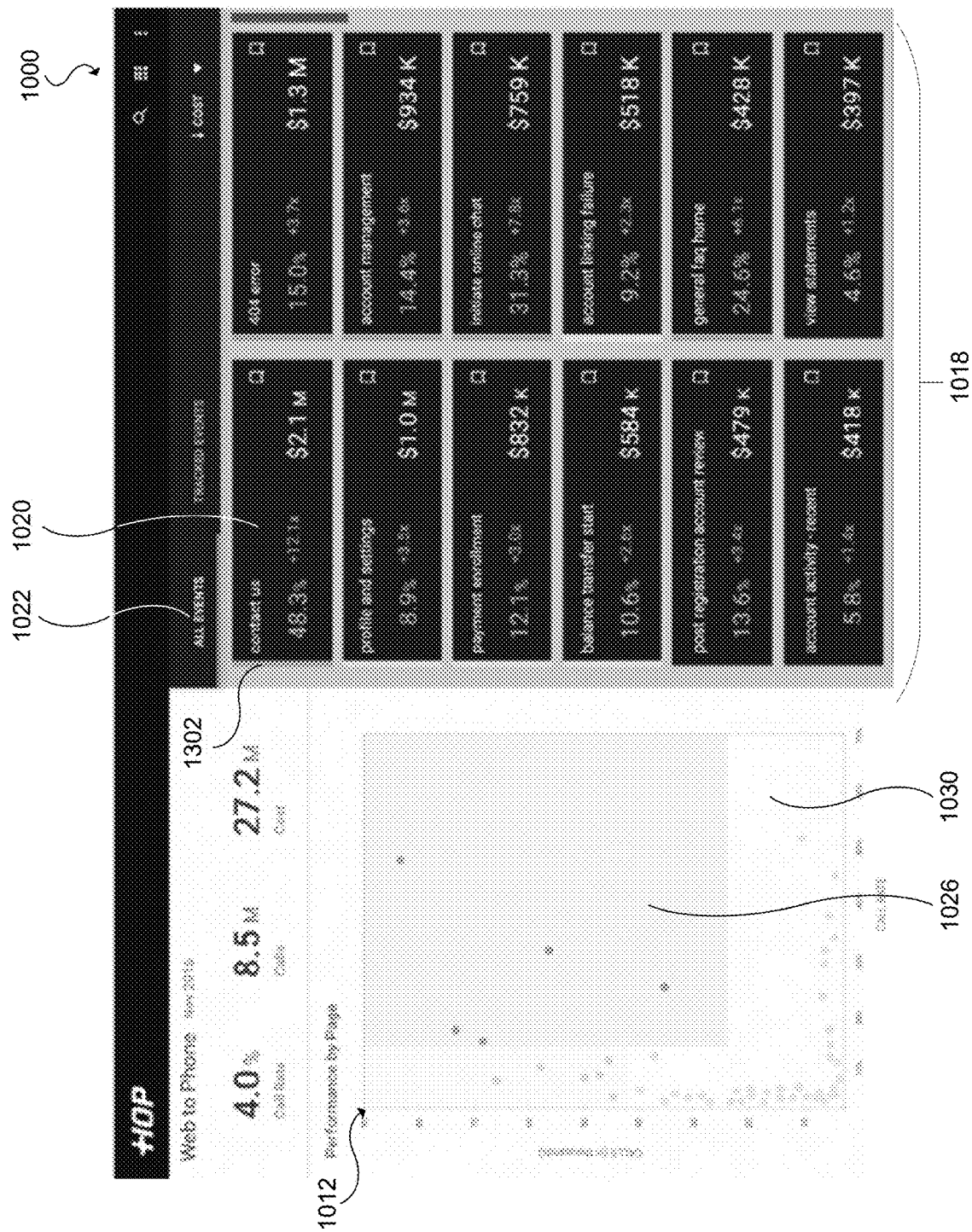
FIG. 13 is an example event discovery interface with events shown in an all-events tab, in accordance with some embodiments of the present disclosure.

FIG. 13 is an exemplary event discovery interface 1000 showing an "all events" tab 1022, according to some embodiments of the present disclosure. In some embodiments, an events panel 1018 may show not only which events are selected but show all events within the dataset. In some embodiments, the individual event cards (e.g., exemplary event card 1020) may also indicate which priority region within the performance chart 1012 the respective event cards 1020 reside. For example, as described above, each event within the performance chart 1012 may reside in a high-priority region 1026, a low-priority region 1030, or any other number of priority regions. These priority regions 1026/1030 may be indicated by a background color, for example a red background for a high-priority region 1026. In some embodiments, the background color of a priority region 1026 may be indicated at the event card 1020. As shown in FIG. 13, the event card 1020 may indicate a location within a particular region 1026/1030 by providing the corresponding color along the event card 1020: the top event card 1020 labeled "contact us" shows a red bar 1302, thereby indicating the "contact us" event is within the high-priority region 1026 of the performance chart 1012.

Additional prioritization methods are conceived for ranking the respective event cards 1020, and those methods are described here or are known by those of skill in the art.

In some embodiments, for workflows in the current systems and methods that contain additional attribute information, such as a transaction cost or other metric described herein, these quantities may be populated in the events panel 1018. In addition to the user-specified attribute information, the standard and advanced metrics and measures provided by the DCAS provides potential categories to sort or otherwise organize and present the results of the calculations.

Figure 14:
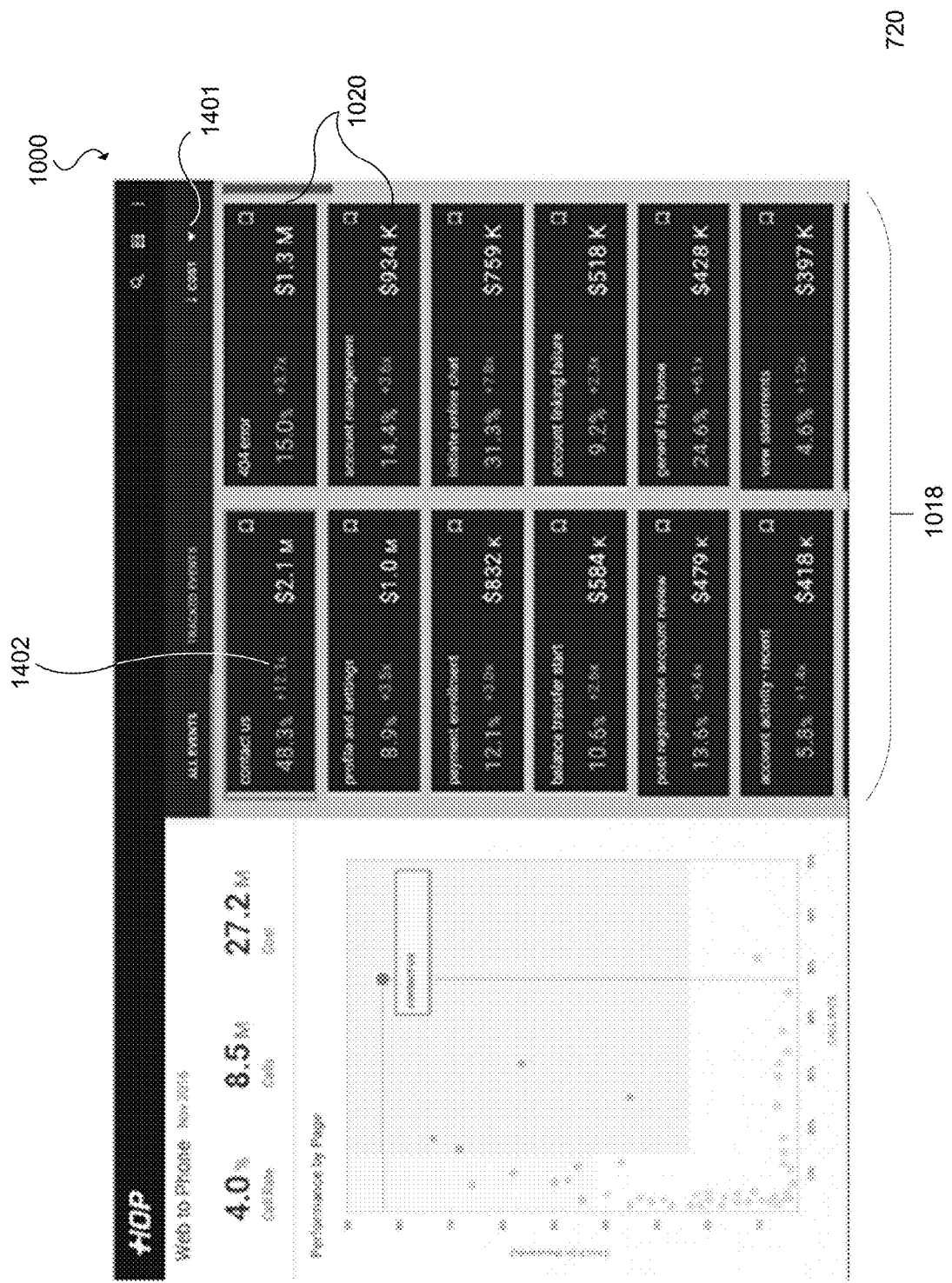
FIG. 14 is an example event discovery interface with an events panel displaying all events in the dataset, in accordance with some embodiments of the present disclosure.

FIG. 14 is an exemplary event discovery interface 1000 with an events panel 1018 displaying all events, according to some embodiments of the present disclosure. In some embodiments, this or a similar interface may be returned upon selection of the "all events" tab 1022 shown in FIG. 13. In some embodiments, this view provides access to all the event cards (e.g., exemplary event cards 1020) representing all the events present in the events panel 1018. In some embodiments, the individual event cards 1020 may be sorted by any measure or metric described herein, such as being sorted by total cost of each event (as sown in FIG. 14). In some embodiments, the sorting method may be provided in a sort drop down menu 1401. In some embodiments, any event card of interest 1402 may be selected for additional analysis. For example, a user may be interested in the top (e.g., highest sorted) event card 1020 and subsequently select the event card of interest 1402 for additional analysis.

Figure 15:
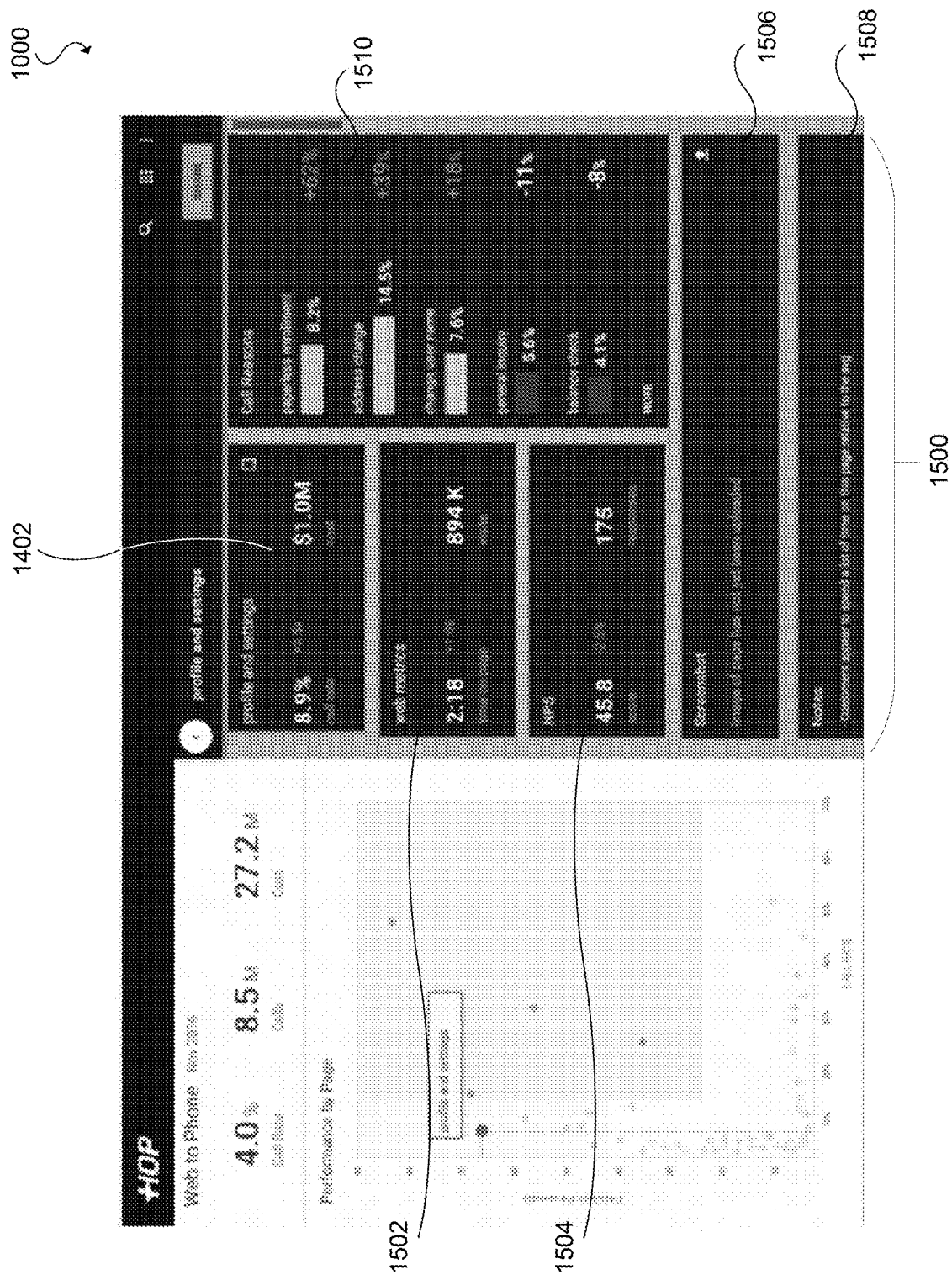
FIG. 15 is an example event discovery interface displaying a selected-card detail pane, in accordance with some embodiments of the present disclosure.

FIG. 15 is an exemplary event discovery interface 1000 displaying a selected-card detail pane 1500, according to some embodiments of the present disclosure. In some embodiments, once an event card of interest 1402 is selected, the system may return a selected-card detail pane 1500, which provides greater detail of the event card of interest 1402. The amount of information presented in a selected-card detail pane 1500 is dependent upon the richness of the dataset supplied to the DCAS; a richer dataset allows the systems and methods to provide a greater amount of analysis. In some embodiments, a selected-card detail pane 1500 may provide any number of cards with advanced metrics. In the exemplary selected-card detail pane 1500 of FIG. 15, the additional cards include a web metrics card 1502 and a net-promoter score (NPS) card 1504, which is in accordance with some embodiments. In an exemplary web metrics card 1502, the system may provide an average time on the web page, the total number of visits to that web page, and a change in the average time (e.g., customers spend an average of one minute and eight seconds longer (+1:08) on this page than the average page). In an exemplary NPS card 1504, the system may provide an average score associated with the event, the number of responses, and the relationship between the NPS score for this event and the average NPS score in the dataset (e.g., the NPS score for this event is 2.5% lower than the NPS score for the average event).

The system may present the additional metric cards (e.g., cards 1502/1504 or any other metric card) to provide additional insight into the event and to provide context to the other metrics presented. Also, the additional metrics cards depend on the type of channels the system has merged for analysis. For example, the analysis in the exemplary event discovery interface 1000 in FIG. 15 is an analysis of web data merged with phone data. The additional metric cards presented will correspond to data within the dataset for web visits and/or data within the dataset for phone calls. Other metric cards are possible. For example, the interface in FIG. 6 shows other digital channels within the channel categories 614. These digital channels include but are not limited to mobile, IVR, and/or ATM channels. Therefore, the additional metric cards may include data corresponding to whichever channel has been merged and the cards are not limited to "web metrics" or NPS scores.

In some embodiments, a selected-card detail pane 1500 may include a screenshot panel 1506. A screenshot panel 1506 may add context and supporting information to the analysis by documenting and facilitating what is often the next step in the process of analyzing the cross-channel containment problem, namely: "is there something visually that stands out about the page in question that could be a significant contributor to the severity of the problem?" Displaying an actual embodiment of the event may help to answer the question. A screenshot panel 1506 may also provide a record for the benefit of posterity—namely in the period-over-period process of analysis, which is part of the well-known "Measure, Analyze, Improve" methodology. In some embodiments, an additional notes panel 1508 may be present in the selected-card detail pane 1500 to receive individualized notes for the given event. In some embodiments, a selected-card detail pane 1500 may include an attribute panel 1510, which is described in detail in FIG. 16.

Figure 16:
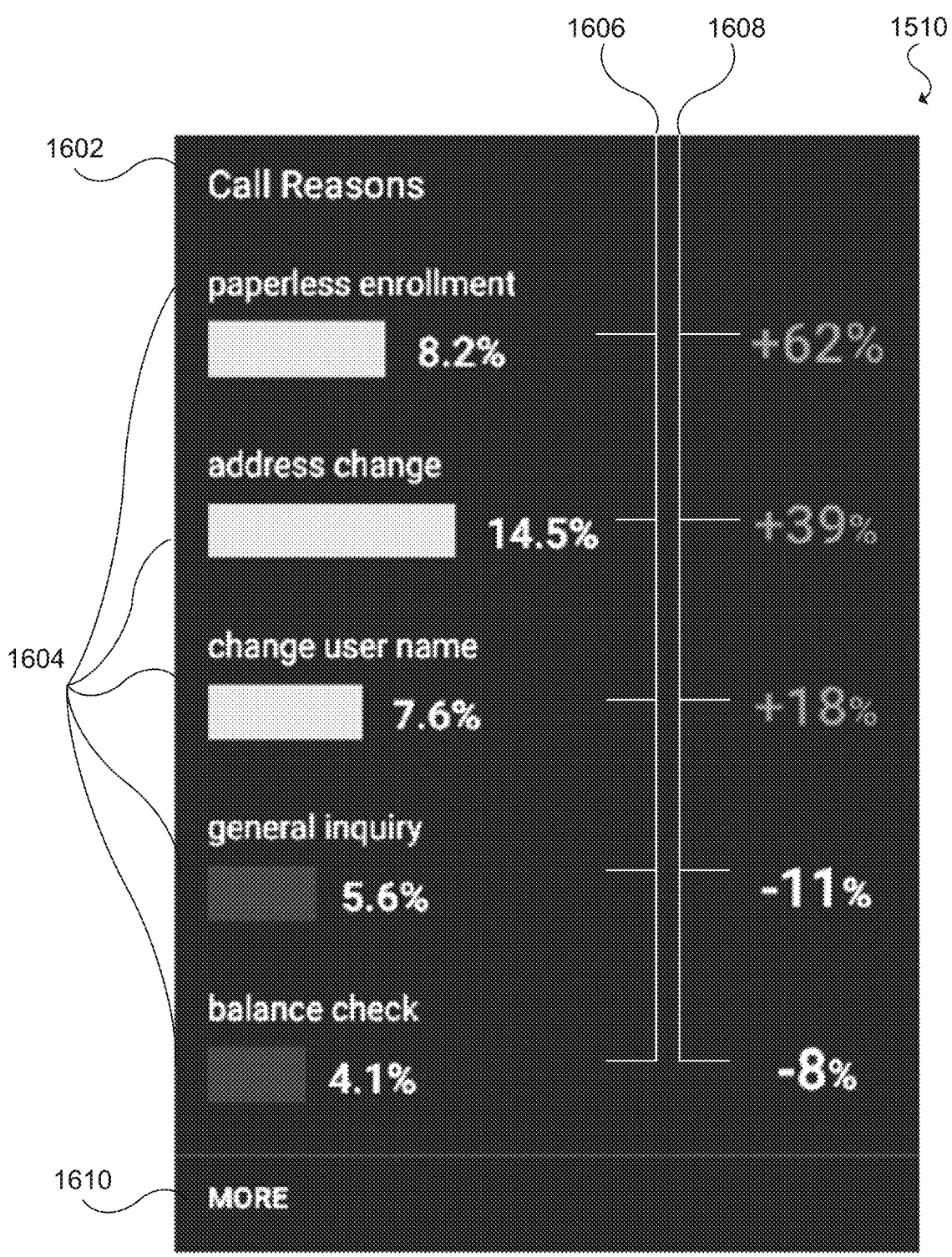
FIG. 16 is an example "additional attribute" panel, in accordance with some embodiments of the present disclosure.

FIG. 16 is an exemplary attribute panel 1510, according to some embodiments of the present disclosure. In some embodiments, an attribute panel 1510 displays additional metrics and measures for the selected event card of interest 1402 (shown in FIG. 14). The data in an attribute panel 1510 is derived from the user-specified information received in the steps depicted in FIGS. 4-9. For example, as disclosed in the discussion for FIG. 9, the key attributes 914 selected for analysis may include arbitrary attributes, e.g., arbitrary Attribute 1 or arbitrary Attribute 2. These attributes may include any of the columns within one of the merged datasets. In the exemplary upload raw data screen 600*d* of FIG. 9, one of the header names 916 available included "Call Reason." Within the dataset, values 918 for the header "Call Reason" may include "paperless enrollment," "address change," "change user name," "general inquiry," "balance check," and so on. If the attribute for "Call Reason" is selected in the key-field screen in FIG. 9, the data for that attribute may be included in an attribute panel 1510. As can be seen, the title 1602 of the selected attribute ("Call Reasons" in the present embodiment) is displayed, and the sub attributes 1604 (the values 918 in FIG. 9) are provided in the attribute panel 1510.

When additional attributes are specified in the data upload process, the disclosed systems and methods may calculate the aggregated values associated with these additional features. In some embodiments, the attribute panel 1510 may provide the sub attributes' 1604 contribution 1606 to the attribute group. In some embodiments, the attributed percentage change 1608 may be provided in the attribute panel 1510. These percentage change calculations 1608 shown in exemplary attribute panel 1510 are available in some embodiments when the DCAS operates on multiple, consecutive time frames. In some embodiments, an attribute panel 1510 may provide a button 1610 to display additional sub attributes 1604 that may not currently be displayed within the panel.

Figure 17:
FIG. 17 is an example event discovery interface displaying a screenshot panel, in accordance with some embodiments of the present disclosure.

FIG. 17 is an exemplary event discovery interface 1000 displaying a screenshot panel 1506, according to some embodiments of the present disclosure. As described above, a screenshot panel 1506 my provide additional context to a cross-channel hop by displaying the exact event that caused the hop. This may allow a user to define which event, if improved, can alleviate some of the higher-cost customer interactions and increase overall customer satisfaction within this aspect of the customers' web experience. In some embodiments, the event discovery interface 1000 may include a share button 1702 to enable and encourage collaboration among analysts and/or business process-owners.

Figure 18:
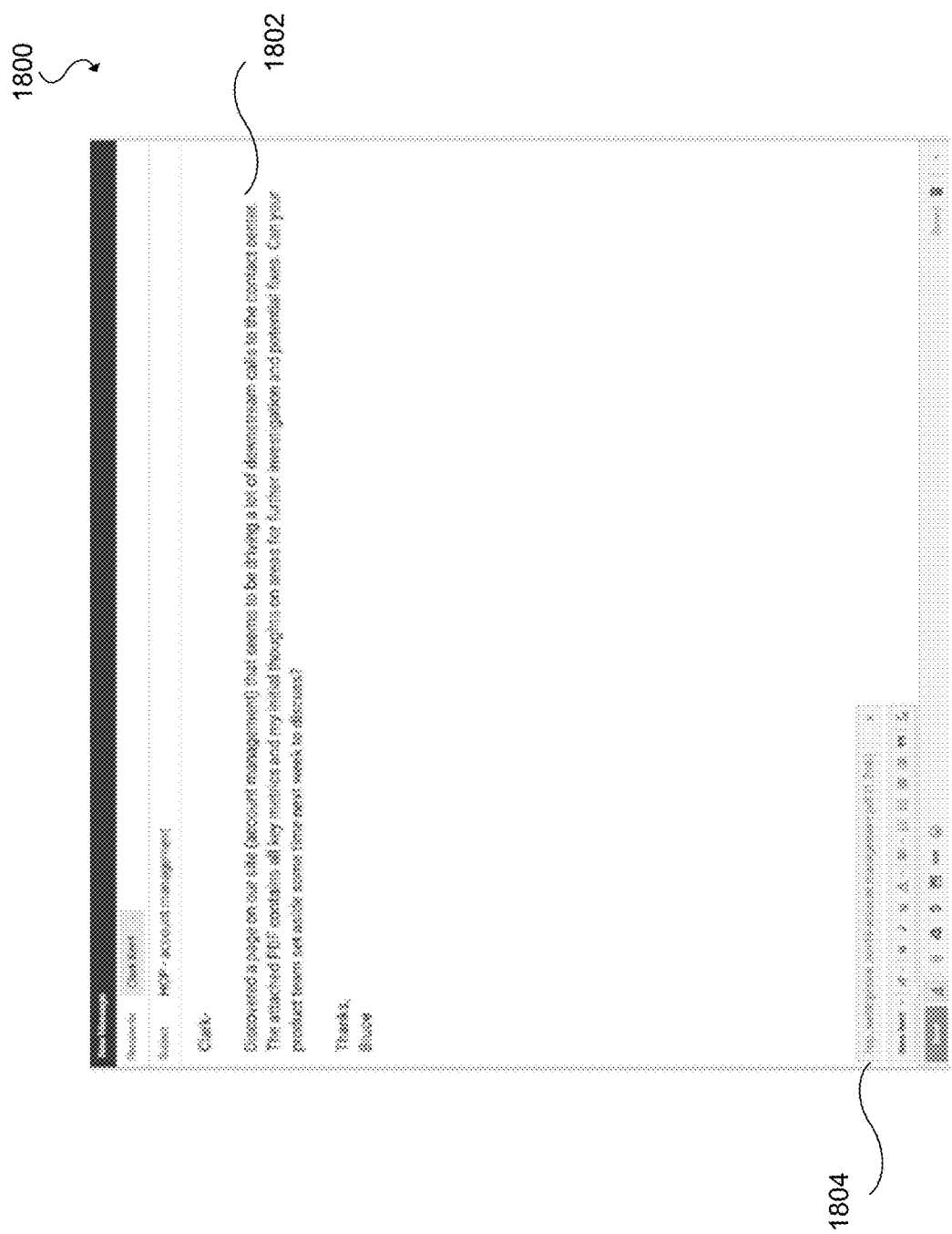
FIG. 18 is an example share interface, in accordance with some embodiments of the present disclosure.

FIG. 18 is an exemplary share interface 1800, according to some embodiments of the present disclosure. In some embodiments, the share button 1702 (shown in FIG. 17) may open a share interface 1800 allowing the end user to send a file with the characteristics of a selected event. In some embodiments, the share interface 1800 may include a pre-populated email 1802 with an attached document 1804. The attached document 1804 may include all metrics and measures for the particular event and a screenshot of the event, for example a web page. As will be appreciated, the attached document 1804 may be sent as a PDF or any similar document format.

Figure 19:
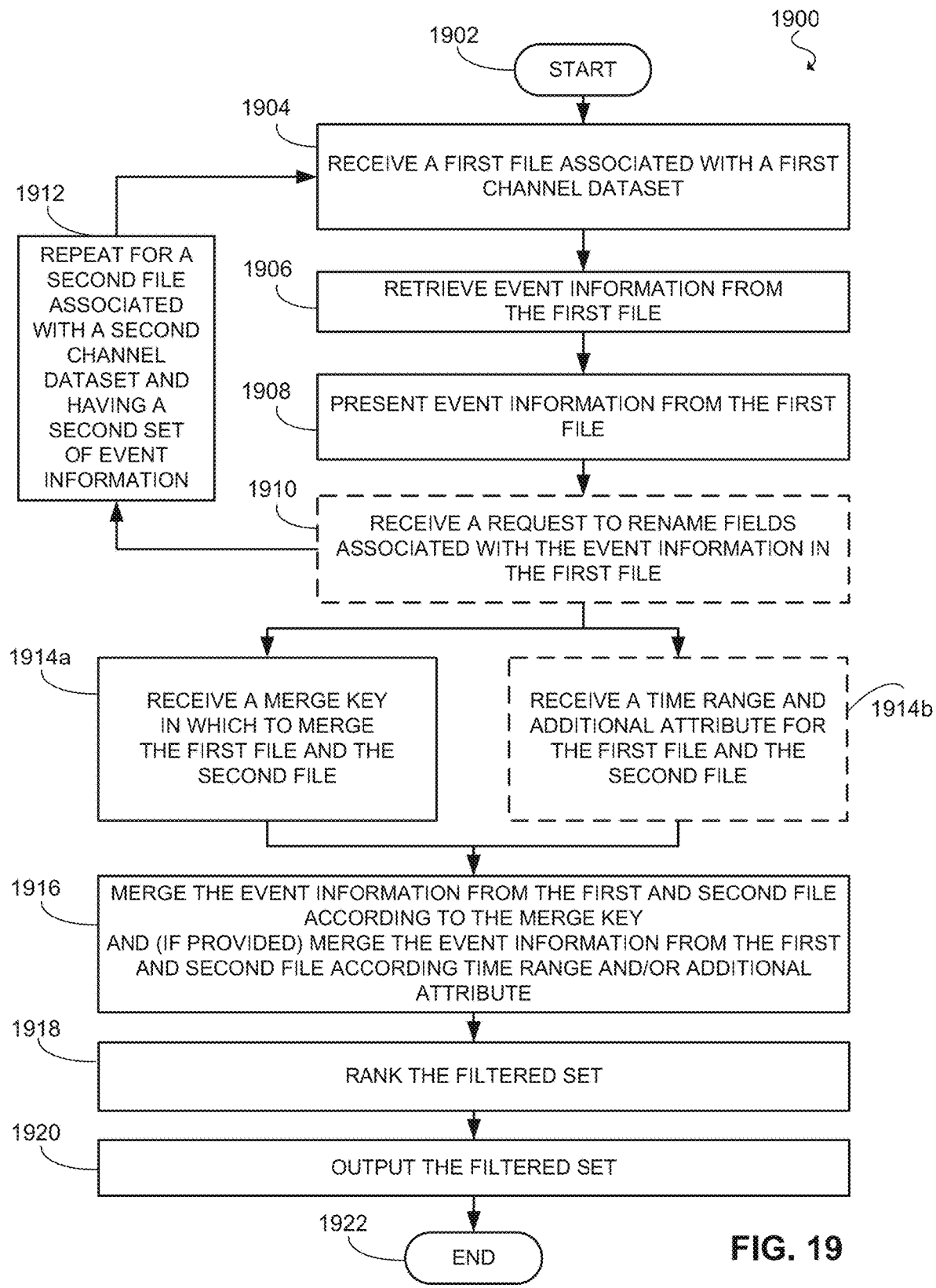
FIG. 19 is an example flow chart illustrating aspects of system functionality, in accordance with some embodiments of the present disclosure.

FIG. 19 is an example flow chart illustrating method 1900 that can be performed by systems of the present disclosure (e.g., a DCAS), according to some embodiments. Method 1900 is merely illustrative of certain functionalities of the disclosed systems and is not intended to be inclusive of all functionalities described herein. Nonetheless, the flow chart is illustrative of the present technology's capabilities. As shown in FIG. 19, method 1900 may begin 1902 when the system receives a first file associated with a first channel dataset 1904. As described above, the eventual data product, or the merged dataset, begins with inputting the parameters and descriptors associated with at least two distinct datasets. These two datasets may comprise event information for a variety of data channels, e.g., web, ATM, phone, etc. The files associated with these channels comprise event data, and the event data includes underlying metadata that defines the events within the files. The first file associated in the current receiving step 1904 may either be a new file or a file already provided to the system in a previous analysis. Additionally, although this exemplary flow chart 1900 indicates that the first file is processed before the second file, nothing prevents the two files from being processed simultaneously. For example, the current step 1904 and the subsequent three exemplary steps (1906-1910) may be performed concurrently on two files, a first and a second file, in one interface or in one series of interfaces.

As shown, method 1900 may include retrieving the event information from the first file 1906. This retrieval may include scrubbing the file to identify the event information within the files and identify the metadata that defines each event. The method 1900 may also include presenting the event information retrieved from the first file 1908. This presentation of event information corresponds to the headers and values described in FIGS. 7-9. For example, the event information may include the metadata associated with event names, dates, times, customer identification numbers, and/or any of the attributes shown or described for the key attributes 914 column of FIG. 9. Presenting the event information to a user allows the system to properly define the event information within the file.

Method 1900 may also include receiving a request to rename fields associated with the event information in the first file 1910. The renaming of the fields within a file corresponds to the steps referred to in the discussion for FIG. 8. For example and as described herein, the system may indicate which headers (ore events) are found within the dataset. In some embodiments, a user may upload a header mapping file that provides a more descriptive name to replace the header names for display purposes. In some embodiments, a user may manually input descriptive names for the headers. Also, the system may receive a description of the uploaded files to better label the entire dataset being analyzed. For example, and as provided in the discussion for FIG. 6, in some embodiments the system may receive a descriptive file name (e.g., "Web (March 2017)"), a description of the file, the time zones associated with the data, the type of channel (e.g., wed, mobile, phone agent, retain agent, etc.), and/or any other descriptive input described herein. The receiving of a request to rename the fields or the file 1910 is, however, not required for the current systems and methods. Although the renaming step facilitates a more user-friendly environment, the technology described herein is capable of merging two datasets without these descriptors.

Method 1900 may further include an additional round of processes wherein the previous steps are repeated for a second file having a second set of event information 1912. A second round of processing may include (1) receiving a second file associated with a second channel dataset, (2) retrieving event information from the second file, (3) presenting event information from the second file, and (4) receiving a request to rename fields associated with the event information in the second file. The same details for the previously described steps 1904-1910 can also be provided for the second file. As described above, although the chart shows a second process for defining the second file, the first file and the second file may be defined concurrently in one interface or in one series of interfaces.

As shown in FIG. 19, method 1900 may further include receiving a merge key in which to merge the first file and the second file 1914a. A description of the merge key is provided in the discussion of FIG. 9 (i.e., Merge Key 904). The system may combine the two resultant files using the attributes of the Merge Key 904. A merge key can be any attribute chosen by an end user to connect the discrete events in the two files. For example, one embodiment may include creating a unique customer identification number generated by the DCAS, wherein the two files may be combined based on the event information for that particular customer.

Method 1900 may further include receiving a time range and additional attributes to associate between the two files 1914b. Unlike the merge key described above, the time range and additional attribute are optional fields that merely facilitate a more complete analysis of the dataset. In some embodiments, the optimal coupling time period for a given set of interactions or channels can be returned by advanced probabilistic determinations with no manual intervention or specification. However, in many cases, the events may span a long period of time. Receiving a time range may enable a faster processing and merging of the two files. The additional attribute helps to present a more detailed analysis and is not required to merge and rank the two datasets. For example, as described in FIGS. 15-16, the system may provide (at a later step) an additional attribute panel 1510 when the system receives an input of which columns in the files should be included as the additional attribute. Also, the systems may receive more than one additional attribute within this step.

Method 1900 may further include merging the event information from the first and second file according to the merge key and, if provided, merging the event information according to the time range and additional attribute 1916. At this step, the two files are filtered and merged according to the received merge key and, if provided, time range and/or additional attribute(s). This step (and the next) corresponds to the Generate HOP object 224 process of the Processing layer 208 of FIG. 2. Method 1900 may include ranking the filtered set 1918. Ranking the filtered set (i.e., merged set) is the final step of the Generate HOP object 224 process. Here, the systems and methods may perform several potential transformations on the two files. For example, the advanced statistical transformations described herein may be performed on the merged dataset. As will be appreciated, the filtered set may be ranked according to overall cost of the channel-hopping event, volume (e.g., call volume or page visits), rates of visits (e.g., call rate), statistical lift, the proprietary statistical measure described herein, or any other metric or measure that may better define the relationships between the merged events.

As seen in FIG. 19, method 1900 may include outputting the filtered set 1920. This outputting corresponds to the events in the Presentation layer 210 in FIG. 2. The output may include any of the exemplary interfaces shown in FIGS. 10-18. For example, the merged events may be ranked and presented in an interactive chart pane 1010 having a performance chart 1012. The merged events may be prioritized according to the methods described for the performance charts (1100a/b/c/d) in FIG. 11. As described above, the output may include an interactive performance chart 1012 that allows individual analysis of a selected event. In some embodiments, the output may include an event card 1020 with metrics and measures, as described above. Many additional visual outputs are described herein and, as will be appreciated, others are possible in this final presentation step for the merged datasets.

What is claimed is:

1. A method of tracking user containment, the method comprising:
   receiving, at a computing device, a first file, the first file comprising data representative of a plurality of events associated with a first channel;
   retrieving, by the computing device, event information for the plurality of events associated with the first channel;
   receiving, at the computing device, a second file, the second file comprising data representative of a plurality of events associated with a second channel;
   retrieving, by the computing device, event information for the plurality of events associated with the second channel;
   receiving, at the computing device, a merge key specifying a manner in which to merge events associated with the first channel with events associated with the second channel;
   merging, by the computing device, the event information associated with the first channel and the event information associated with the second channel based on the merge key;
   generating, by the computing device, a merged dataset, the merged dataset comprising a plurality of merged events representing events from the first channel merged with events from the second channel;
   generating, by the computing device, graphical user interface data, wherein the graphical user interface data comprises the merged dataset;
   generating, by the computing device, a graphical user interface comprising a performance chart having two axes, wherein the plurality of merged events are plotted within the performance chart; and
   outputting, by the computing device, the graphical user interface data and the graphical user interface for display in a user device,
   wherein the performance chart comprises (i) a first axis defining an overall volume of each merged event in the merged dataset, and a second axis defining an overall rate of visits to each merged event in the merged dataset and (ii) a high-priority region and a low-priority region within the first axis and the second axis, and
   wherein each merged event of the plurality of merged events are selectable within the graphical users interface for further analysis.

2. The method of claim 1, wherein retrieving event information for the plurality of events associated with the first channel and the second channel comprises scrubbing the first file and the second file to identify metadata associated with each event of the plurality of events.

3. The method of claim 1, wherein the first channel is a web channel and the second channel is a live phone channel.

4. The method of claim 1, wherein the merge key specifies at least one of a customer identification number, webpage name, event date, event time, or call reason.

5. The method of claim 1, wherein the graphical user interface data further comprises event information for the plurality of events associated with the first channel and event information for the plurality of events associated with the second channel.

6. The method of claim 5 further comprising receiving, at the computing device, data indicative of a request to rename a field associated with at least one of the first file or the second file, wherein the field is a category of event information present within the first or second file.

7. The method of claim 1 further comprising:
   receiving, at the computing device, a time range for filtering the events of the plurality of events associated with the first channel and the second channel; and
   filtering, by the computing device and based on the time range, the first file and the second file.

8. The method of claim 1 further comprising:
   receiving, at the computing device, an additional attribute in which to merge events associated with the first channel with events associated with the second channel; and
   filtering, by the computing device, the first file and the second file based on the additional attribute.

9. The method of claim 8, wherein the additional attribute comprises a total cost to a particular event of the plurality of events associated with the first channel and the second channel.

10. The method of claim 1 further comprising:
    ranking, by the computing device, the plurality of merged events, by filtering each merged event of the plurality of merged events by at least one of:
    an overall cost of the merged event;
    the overall volume of the merged event in the merged dataset;
    the overall rate of visits to the merged event in the merged dataset; or
    a statistical lift of the merged event over the merged dataset.

11. The method of claim 1, wherein the graphical user interface is configured to receive an indication of a selection of a merged event from the plurality of merged events plotted on the performance chart, and wherein the computing device is further configured to output, for display in the graphical user interface, an event card for the selected merged event, the method further comprising:
    receiving, on the graphical user interface, a selection of a merged event from the plurality of merged events plotted on the performance chart;
    displaying, on the graphical user interface, an event card for the selected event, wherein the event card comprises at least one of:

an overall cost of the selected event;
the overall volume of the selected event in the merged dataset;
the overall rate of visits to the selected event in the merged dataset; or
a statistical lift of the selected event over the merged dataset.

12. The method of claim 1, wherein the computing device determines which merged events fall within the high-priority region or the low-priority region based on at least one of:
an overall cost of the merged event;
the overall volume of the merged event in the merged dataset;
the overall rate of visits to the merged event in the merged dataset; or
a statistical lift of the merged event over the merged dataset.

13. A method of tracking customer channel hops, the method comprising:
receiving, at a computing device, a first file associated with a first channel dataset, the first file comprising event information representing a plurality of distinct customer events;
retrieving, by the computing device, the event information from the first file;
receiving, at the computing device, a second file associated with a second channel dataset, the second file comprising event information representing a plurality of distinct customer events;
presenting, by the computing device and for display in a graphical user interface, the event information from the first file and the second file;
receiving, at the computing device, a merge key in which to merge the distinct customer events from the first file and the second file;
merging, by the computing device, the plurality of distinct customer events from the first file and the second file based on the merge key;
generating, by the computing device, a plurality of merged events;
outputting, by the computing device and for display in the graphical user interface, a merged dataset comprising the plurality of merged events; and
generating, by the computing device, the graphical user interface comprising a performance chart having two axes, wherein the plurality of merged events are plotted within the performance chart,
wherein the performance chart comprises (i) a first axis defining an overall volume of each merged event in the merged dataset, and a second axis defining an overall rate of visits to each merged event in the merged dataset and (ii) a high-priority region and a low-priority region within the first axis and the second axis.

14. The method of claim 13, wherein the merge key is a unique customer identification number generated by the computing device, the method further comprising:
analyzing, by the computing device, metadata associated with the event information from the first file and the second file; and
generating, by the computing device, a unique customer identification number based on the metadata.

15. The method of claim 13 further comprising:
receiving, at the computing device, a time range of events to include in the merged dataset; and
merging, by the computing device, the plurality of distinct customer events from the first file and the second file based on the time range.

16. The method of claim 13, wherein the event information from the first and second file comprises a plurality of fields associated with the plurality of distinct customer events, the method further comprising:
receiving, at the computing device, an additional attribute to include in the merged dataset, wherein the additional attribute is not the merge key; and
merging, by the computing device, the plurality of distinct customer events from the first file and the second file based on the additional attribute.

17. The method of claim 16, wherein the additional attribute comprises a total cost to a particular event of the plurality of events associated with the first channel and the second channel.

18. The method of claim 13, wherein the event information from the first and second file comprises a plurality of fields associated with the plurality of distinct customer events, the method further comprising receiving, at the computing device, a request to rename at least one field of the plurality of fields.

19. The method of claim 13, wherein the performance chart is interactive, and wherein each merged event of the plurality merged events can be selected, via the graphical user interface, for individual analysis.

* * * * *